United States Patent
Otohata et al.

(10) Patent No.: US 11,581,525 B2
(45) Date of Patent: *Feb. 14, 2023

(54) SECONDARY BATTERY ELECTRODE MANUFACTURING METHOD AND SECONDARY BATTERY MANUFACTURING METHOD

(71) Applicant: NEC Corporation, Tokyo (JP)

(72) Inventors: Makihiro Otohata, Tokyo (JP); Noboru Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 2 days.

This patent is subject to a terminal disclaimer.

(21) Appl. No.: 16/500,508

(22) PCT Filed: Feb. 8, 2018

(86) PCT No.: PCT/JP2018/004385
§ 371 (c)(1),
(2) Date: Oct. 3, 2019

(87) PCT Pub. No.: WO2018/186017
PCT Pub. Date: Oct. 11, 2018

(65) Prior Publication Data
US 2020/0058930 A1 Feb. 20, 2020

(30) Foreign Application Priority Data

Apr. 4, 2017 (JP) .............................. JP2017-074381
Nov. 24, 2017 (JP) .............................. JP2017-225612

(51) Int. Cl.
*H01M 4/139* (2010.01)
*H01M 4/04* (2006.01)

(52) U.S. Cl.
CPC ......... *H01M 4/139* (2013.01); *H01M 4/0404* (2013.01); *H01M 4/0471* (2013.01)

(58) Field of Classification Search
CPC ......... H01M 4/02–139; H01M 4/0471; H01M 4/0404
See application file for complete search history.

(56) References Cited

U.S. PATENT DOCUMENTS

2011/0111277 A1* 5/2011 Bessho ................. H01M 4/661
429/94
2013/0273421 A1* 10/2013 Matsumura ............. H01M 4/13
429/211

FOREIGN PATENT DOCUMENTS

CN 102487137 A 6/2012
JP 09-223499 A 8/1997
(Continued)

OTHER PUBLICATIONS

EPO machine translation of JP2008198596 originally published to Sugiyama Hiroshi dated Aug. 28, 2008 (Year: 2008).*
(Continued)

*Primary Examiner* — Cynthia H Kelly
*Assistant Examiner* — Niara Trant
(74) *Attorney, Agent, or Firm* — Sughrue Mion, PLLC

(57) ABSTRACT

One of the objects of the present invention is to suppress mixing of a first layer and a second layer while forming the second layer before drying the first layer when manufacturing the electrode for the secondary battery in which the first layer and the second layer are laminated on the current collector. A method for manufacturing an electrode used as a positive electrode and a negative electrode of a secondary battery according to the present invention comprises applying a first layer slurry to a surface of a current collector, applying a second layer slurry on the first layer slurry before the first layer slurry is dried, and drying the first layer slurry and the second layer slurry after applying the first layer slurry and the second layer slurry to obtain a laminated structure in which a first layer and a second layer are (Continued)

laminated in this order on the current collector. A viscosity of the first layer slurry is 12000 mPa·s or more, and/or a viscosity of the second layer slurry is 4000 mPa·s or more when the viscosities of the first layer slurry and the second layer slurry are measured at 25° C. with a shear rate of 1/sec.

10 Claims, 11 Drawing Sheets

(56) References Cited

FOREIGN PATENT DOCUMENTS

| | | |
|---|---|---|
| JP | 2000-015173 A | 1/2000 |
| JP | 2000331675 A * | 11/2000 |
| JP | 3622383 B2 | 2/2005 |
| JP | 2008-034215 A | 2/2008 |
| JP | 2008-198596 A | 8/2008 |
| JP | 2013-191550 A | 9/2013 |
| JP | 2014-211945 A | 11/2014 |
| JP | 2014-229479 A | 12/2014 |
| WO | 2015/045533 A1 | 4/2015 |

OTHER PUBLICATIONS

EPO machine translation of JP2014229479 originally published to Kato Shigemoto dated Dec. 12, 2014 (Year: 2014).*
EPO English Machine translation of JP 200031675, originally published to Matsumoto Akira dated Nov. 30, 2000. (Year: 2000).*
International Search Report of PCT/JP2018/004385 dated Mar. 13, 2018 [PCT/ISA/210].
Chinese Office Action for CN Application No. 201880022059.7 dated Dec. 30, 2021 with English Translation.

* cited by examiner

SECONDARY BATTERY ELECTRODE MANUFACTURING METHOD AND SECONDARY BATTERY MANUFACTURING METHOD

CROSS REFERENCE TO RELATED APPLICATIONS

This application is a National Stage of International Application No. PCT/JP2018/004385, filed Feb. 8, 2018, claiming priorities to Japanese Patent Application Nos. 2017-074381, filed Apr. 4, 2017 and 2017-225612, filed Nov. 24, 2017.

TECHNICAL FIELD

The present invention relates to a method for manufacturing an electrode used as a positive electrode and a negative electrode of a secondary battery.

BACKGROUND ART

Secondary batteries are widely used as power sources for portable electronic devices such as smart phones, tablet computers, notebook computers, digital cameras, and the like. In addition, secondary batteries have been expanding their application as power sources for electric vehicles and household power supplies. Among them, since lithium ion secondary batteries are high in energy density and light in weight, they are indispensable energy storage devices for current life.

A conventional battery including a secondary battery has a structure in which a positive electrode and a negative electrode, which are electrodes, are opposed to each other with a separator interposed therebetween. The positive electrode and the negative electrode each have a sheet-like current collector and active material layers formed on both sides of the current collector. The separator serves to prevent a short circuit between the positive electrode and the negative electrode and to effectively move ions between the positive electrode and the negative electrode. Conventionally, a polyolefin-based microporous separator made of polypropylene or polyethylene material is mainly used as the separator. However, the melting points of polypropylene and polyethylene materials are generally 110° C. to 160° C. Therefore, when a polyolefin-based separator is used for a battery with a high energy density, the separator melts at a high temperature of the battery, and a short circuit may occur between the electrodes in a large area, which cause smoke and ignition of the battery.

Therefore, in order to improve the safety of the secondary battery, the following techniques are known. Patent Literature 1 (Japanese Patent No. 3622383) describes a technique for manufacturing an electrode of a secondary battery having a structure in which a current collector, an electrode material layer, and a protective layer are laminated by simultaneously applying coating liquids for the electrode material layer and the protective layer on the current collector and drying the coating liquids.

Patent Literature 2 (Japanese Patent Laid-Open No. 2013-191550) discloses an electrode for a secondary battery having an active material layer formed on a current collector and a porous insulating layer formed on the active material layer. Patent Literature 3 (Japanese Patent Application Laid-Open No. 2014-211945) discloses an electrode for a secondary battery in which a mixture layer of an active material is formed on a surface of a current collector and a surface layer that improves lithium acceptability is formed on the surface of the mixture layer. The maximum height roughness of the interface between the mixture layer and the surface layer is 2 to 25 μm, and the thickness of the surface layer is 3 to 20 μm, which provides the electrode for the secondary battery in which the adhesion strength between the mixture layer and the surface layer is ensured and having an excellent safety and charging characteristics.

Patent Literature 4 (WO 2015/045533) also describes forming an electrode material layer on a surface of a current collector and forming an insulating layer on the surface of the electrode material layer as a method for manufacturing an electrode for a secondary battery. More specifically, after applying an electrode material slurry to the surface of the current collector, the surface of the electrode material slurry is solidified by applying a solidifying liquid for depositing a binder component contained in the slurry.

Then, an insulating material slurry is applied on the electrode material slurry in which the surface thereof was solidified. Finally, the electrode material slurry and the insulating material slurry are dried, thereby obtaining a configuration in which the electrode material layer and the insulating layer are laminated on the current collector. Alternatively, after applying the electrode material slurry onto the current collector, the insulating material slurry containing a first component for depositing a binder of the electrode material slurry is applied. Then, the electrode material slurry is solidified by supplying the electrode material slurry with a solidifying liquid containing a second component for depositing a binder of the electrode material slurry. Finally, the electrode material slurry and the insulating material slurry are dried, thereby obtaining a configuration in which the electrode material layer and the insulating layer are laminated on the current collector.

CITATION LIST

Patent Literature

Patent Literature 1: Japanese Patent No. 3622383
Patent Literature 2: Japanese Patent Laid-Open No. 2013-191550
Patent Literature 3: Japanese Patent Laid-Open No. 2014-211945
Patent Literature 4: PCT International Publication No. WO 2015/045533

SUMMARY OF INVENTION

Technical Problem

However, in the technique described in Patent Literature 1, since the coating liquid for the insulating layer is applied before the coating liquid for the active material layer is dried, both coating liquids are mixed in the vicinity of the interface between the active material layer and the insulating layer, and the active material layer and the insulating layer form a mixed portion at the interface. Local mixing of both layers is desirable for improving the adhesion of both layers. However, significant mixing may cause a decrease in charge/discharge capacity, an increase in battery resistance, a decrease in insulation effect, and the like. In order to suppress the mixing of both layers, as described in Patent Literature 2, the insulating layer may be formed after the active material layer is dried. In this case, the electrode manufacturing process becomes complicated.

Alternatively, in order to suppress mixing of the active material layer and the insulating layer, it is conceivable to specify the maximum height roughness of the interface between both layers as described in Patent Literature 3. However, when actually manufacturing the electrode, it is extremely difficult to control the maximum height roughness of the interface between the two layers so as to be within a specific range.

On the other hand, the manufacturing method described in Patent Literature 4 requires a step of supplying a solidifying liquid for solidifying the electrode material slurry, and the electrode manufacturing process becomes complicated as in the manufacturing method described in Patent Literature 2.

It is an object of the present invention to provide a method for manufacturing an electrode for a secondary battery and a method for manufacturing a secondary battery which suppresses mixing of a first layer and a second layer while forming the second layer before drying the first layer when manufacturing the electrode for the secondary battery in which the first layer and the second layer are laminated on the current collector.

Solution to Problem

A method for manufacturing an electrode for a secondary battery according to the present invention comprises:
applying a first layer slurry to a surface of a current collector,
applying a second layer slurry on the first layer slurry before the first layer slurry is dried, and
drying the first layer slurry and the second layer slurry after applying the first layer slurry and the second layer slurry to obtain a laminated structure in which a first layer and a second layer are laminated in this order on the current collector,
wherein a viscosity of the first layer slurry is 12000 mPa·s or more, and/or a viscosity of the second layer slurry is 4000 mPa·s or more when the viscosities of the first layer slurry and the second layer slurry are measured at 25° C. with a shear rate of 1/sec.

Alternatively, when the viscosity of the first layer slurry and the second layer slurry is measured at 25° C. with a shear rate of 1/sec, the viscosity of the second layer slurry is 4000 mPa·s or more and the viscosity of the first layer slurry is 5000 mPa·s or more.

Advantageous Effects of Invention

According to the present invention, high insulation property between the electrodes can be maintained and internal short circuit can be suppressed by adopting an insulating layer having a specific structure in a secondary battery having the insulating layer on a surface of an electrode.

DESCRIPTION OF EMBODIMENTS

Figure 1:
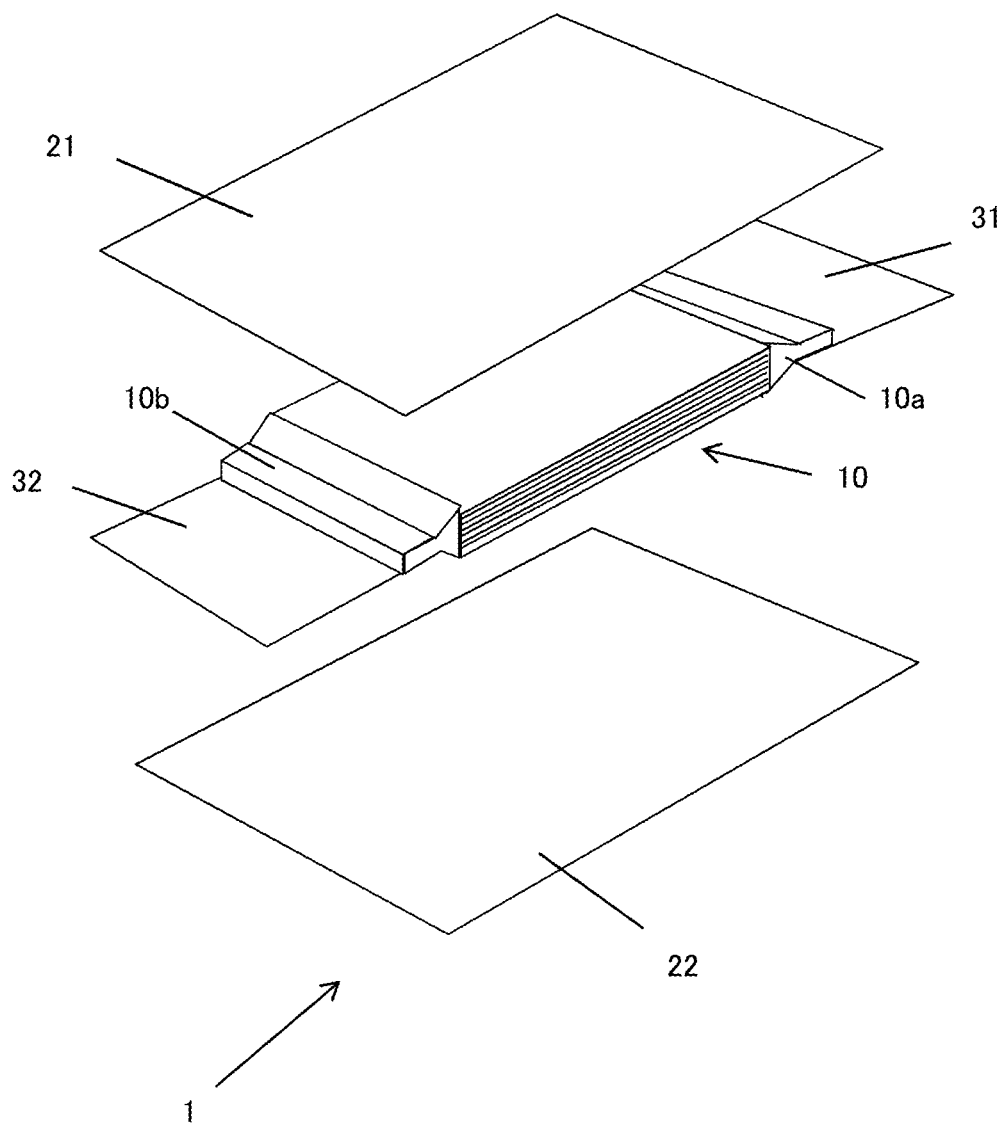
FIG. 1 is an exploded perspective view of a secondary battery according to one embodiment of the present invention.

Referring to FIG. 1, an exploded perspective view of a secondary battery 1 according to one embodiment of the present invention is shown, which comprises a battery element 10 and a casing enclosing the battery element 10 together with an electrolyte. The casing has casing members 21, 22 that enclose the battery element 10 from both sides in the thickness direction thereof and seal outer circumferential portions thereof to thereby seal the battery element 10 and the electrolyte. A positive electrode terminal 31 and a negative electrode terminal 32 are respectively connected to the battery element 10 with protruding part of them from the casing.

Figure 2:
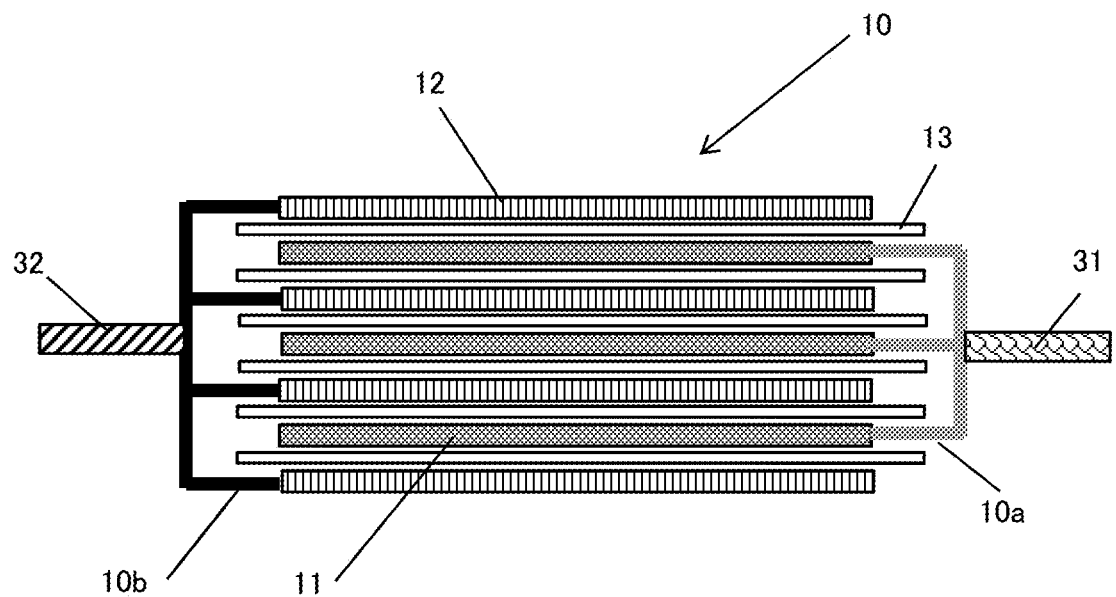
FIG. 2 is a schematic sectional view of a battery element shown in FIG. 1.

As shown in FIG. 2, the battery element 10 has a configuration in which a plurality of positive electrodes 11 and a plurality of negative electrodes 12 are disposed to face each other so as to be alternately positioned. In addition, a separator 13 is disposed between the positive electrode 11 and the negative electrode 12 to ensure ion conduction between the positive electrode 11 and the negative electrode 12 and to prevent a short circuit between the positive electrode 11 and the negative electrode 12. However, the separator 13 is not essential in the present embodiment.

Figure 3:
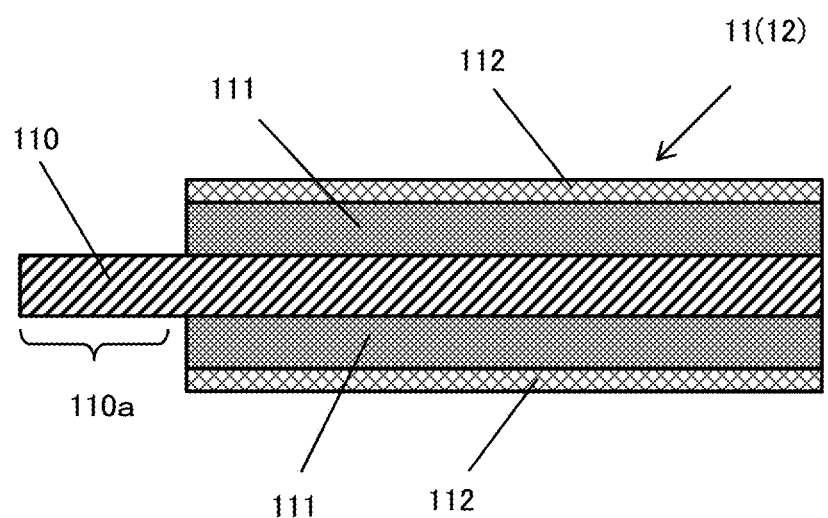
FIG. 3 is a schematic sectional view showing the configuration of a positive electrode and a negative electrode shown in FIG. 2.

Structures of the positive electrode 11 and the negative electrode 12 will be described with further reference to FIG. 3. In the structure shown in FIG. 3, the positive electrode 11 and the negative electrode 12 are not particularly distinguished, but the structure is applicable to both the positive electrode 11 and the negative electrode 12. The positive electrode 11 and the negative electrode 12 (collectively referred to as "electrode" in a case where these are not distinguished) include a current collector 110 which can be formed of a metal foil, an active material layer 111 formed on one or both surfaces of the current collector 110. The active material layer 111 is preferably formed in a rectangular shape in plan view, and the current collector 110 has a shape having an extended portion 110a extending from a region where the active material layer 111 is formed.

The extended portion 110a of the positive electrode 11 and the extended portion 110a of the negative electrode 12 are formed at positions not overlapping each other in a state where the positive electrode 11 and the negative electrode 12 are laminated. However, the extension portions 110a of the positive electrodes 11 are positioned to overlap with each other, and the extension portions 110a of the negative electrodes 12 are also similar to each other. With such arrangement of the extended portions 110a, in each of the plurality of positive electrodes 11, the respective extended portions 110a are collected and welded together to form a positive electrode tab 10a. Likewise, in the plurality of negative electrodes 12, the respective extended portions 110a are collected and welded together to form a negative electrode tab 10b. A positive electrode terminal 31 is electrically connected to the positive electrode tab 10a and a negative electrode terminal 32 is electrically connected to the negative electrode tab 10b.

At least one of the positive electrode 11 and the negative electrode 12 further includes an insulating layer 112 formed on the active material layer 111. The insulating layer 112 is formed in a region where the active material layer 111 is not exposed in plan view and may be formed so as to cover a part of the extended portion 110a. In the case where the active material layer 111 is formed on both surfaces of the current collector 110, the insulating layer 112 may be formed on both the active material layers 111 or only on one of the active material layers 111.

Figure 4A:
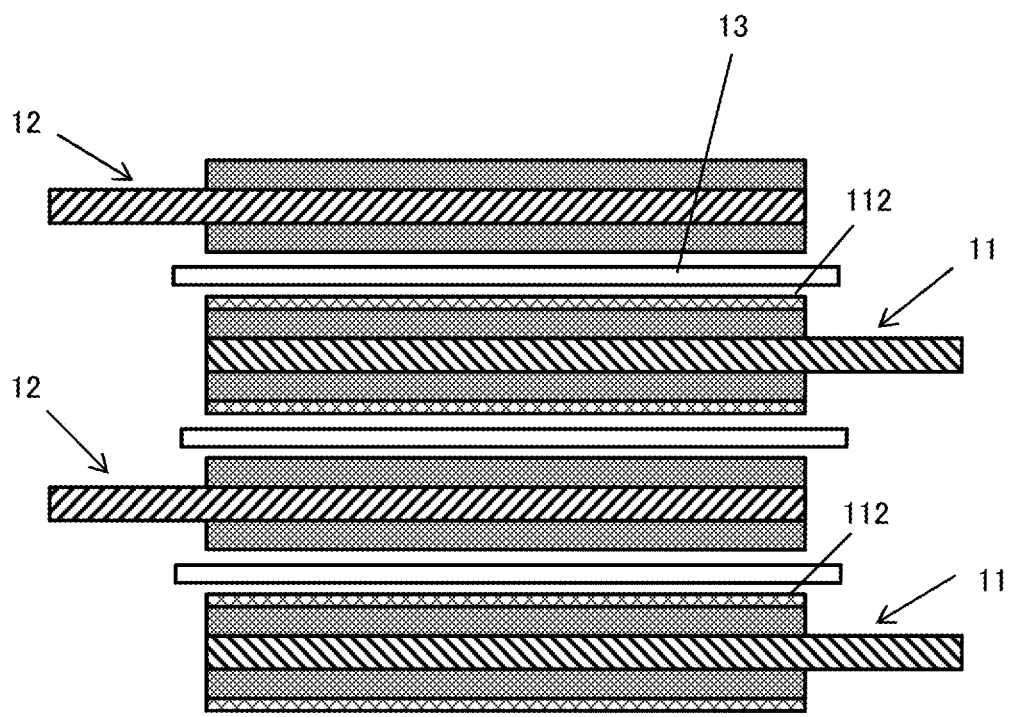
FIG. 4A is a sectional view showing an example of arrangement of the positive electrode and the negative electrode in the battery element.
Figure 4B:
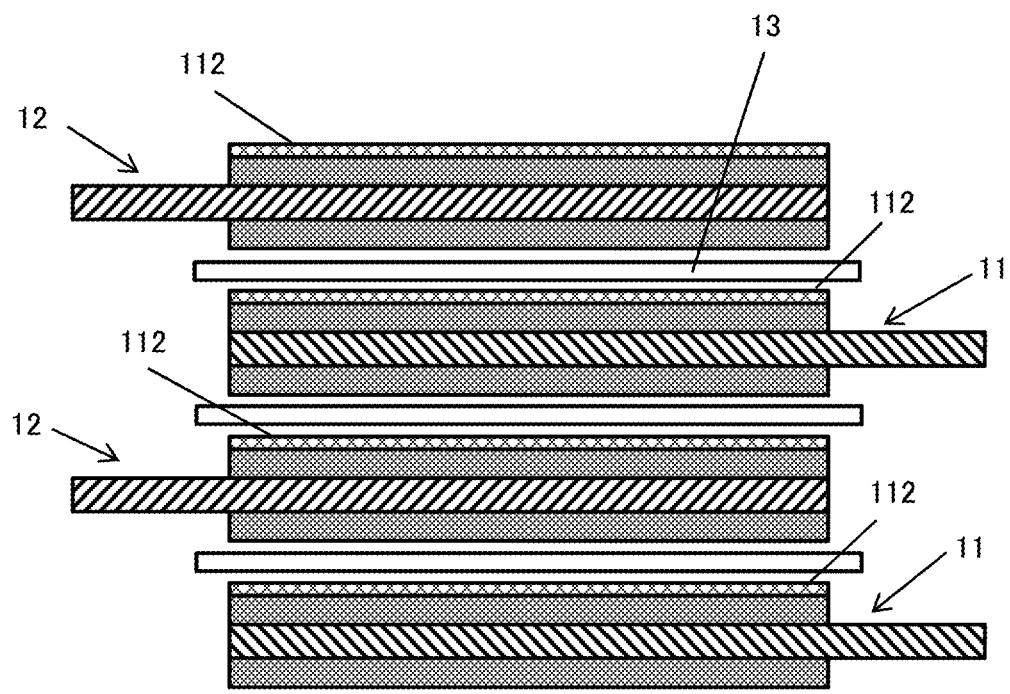
FIG. 4B is a sectional view showing another example of arrangement of the positive electrode and the negative electrode in the battery element.
Figure 4C:
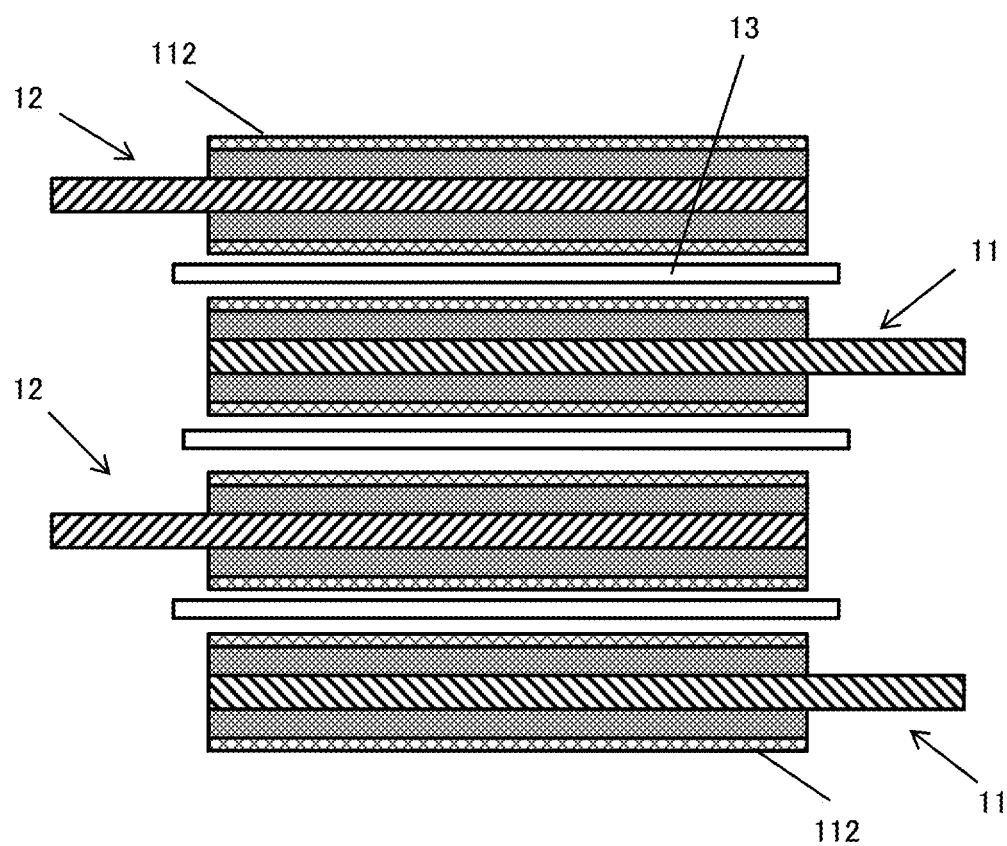
FIG. 4C is a sectional view showing another example of arrangement of the positive electrode and the negative electrode in the battery element.

Some examples of the arrangement of the positive electrode 11 and the negative electrode 12 having such a structure are shown in FIGS. 4A to 4C. In the arrangement shown in FIG. 4A, the positive electrode 11 having the insulating layer 112 on both sides and the negative electrode 12 not having the insulating layer are alternately laminated. In the arrangement shown in FIG. 4B, the positive electrode 11 and the negative electrode 12 having the insulating layer 112 on only one side are alternately laminated in such a manner that the respective insulating layers 112 do not face each other. In the arrangement shown in FIG. 4C, positive electrodes 11 having insulating layers 112 on both surfaces and negative electrodes 12 having insulating layers 112 on both surfaces are alternately laminated.

In the structures shown in FIGS. 4A to 4C, since the insulating layer 112 exists between the positive electrode 11 and the negative electrode 12, the separator 13 can be omitted. The positive electrode 11 and the negative electrode 12 are formed into a predetermined shape by punching or the like, and at this time, a large burr may occur. Therefore, when a separator is not necessary, in order to prevent a short circuit between the positive electrode 11 and the negative electrode 12 due to such large burrs, the positive electrode 11 and the negative electrode 12 preferably have insulating layers 112 on both sides.

The structure and arrangement of the positive electrode 11 and the negative electrode 12 are not limited to the above examples and various modifications are possible as long as the insulating layer 112 is provided on at least one surface of at least one of the positive electrode 11 and the negative electrode 12 and the positive electrode 11 and the negative electrode 12 are arranged such that the insulating layer 112 exists between the positive electrode 11 and the negative electrode 12 For example, in the structures shown in FIGS. 4A and 4B, the relationship between the positive electrode 11 and the negative electrode 12 can be reversed.

Since the battery element 10 having a planar laminated structure as illustrated has no portion having a small radius of curvature (a region close to a winding core of a winding structure), the battery element 10 has an advantage that it is less susceptible to the volume change of the electrode due to charging and discharging as compared with the battery element having a wound structure. That is, the battery element having a planar laminated structure is effective for an electrode assembly using an active material that is liable to cause volume expansion.

Figure 5:
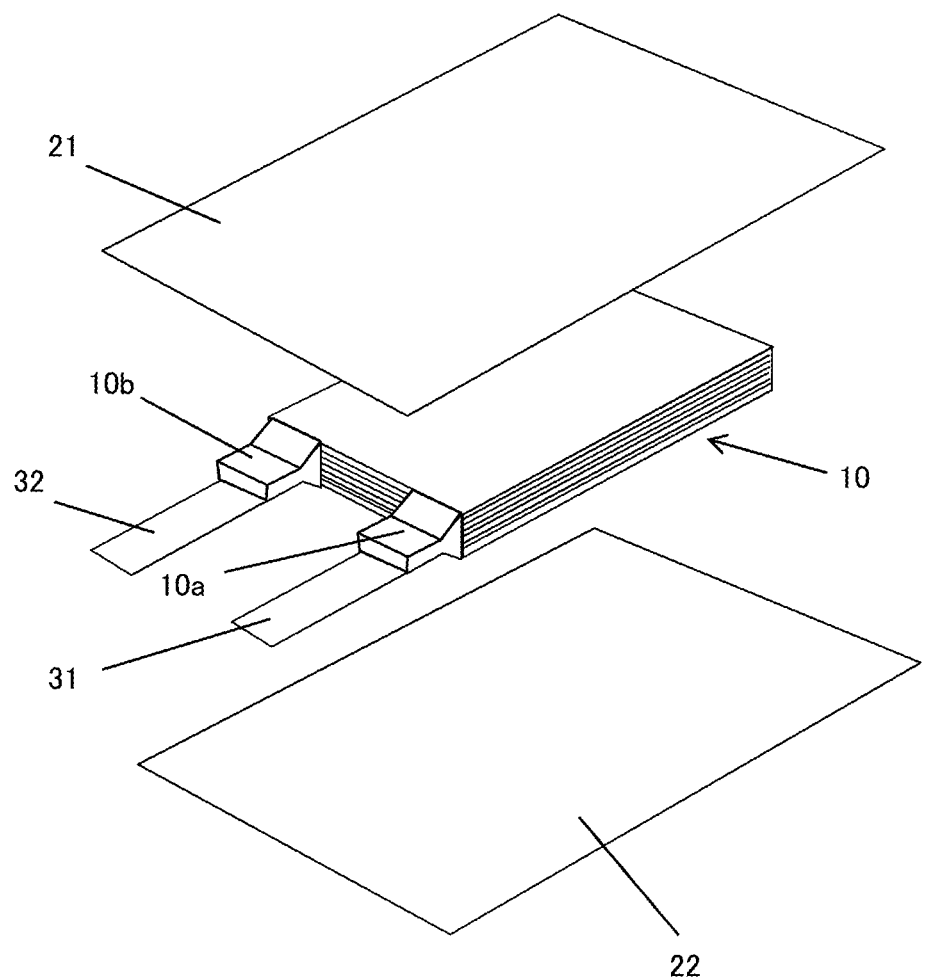
FIG. 5 is an exploded perspective view of a secondary battery according to another embodiment of the present invention.

In the embodiment shown in FIGS. 1 and 2, the positive electrode terminal 31 and the negative electrode terminal 32 are drawn out in opposite directions, but the directions in which the positive electrode terminal 31 and the negative electrode terminal 32 are drawn out may be arbitrary. For example, as shown in FIG. 5, the positive electrode terminal 31 and the negative electrode terminal 32 may be drawn out from the same side of the battery element 10. Although not shown, the positive electrode terminal 31 and the negative electrode terminal 32 may also be drawn out from two adjacent sides of the battery element 10. In both of the above case, the positive electrode tab 10a and the negative electrode tab 10b can be formed at positions corresponding to the direction in which the positive electrode terminal 31 and the negative electrode terminal 32 are drawn out.

Furthermore, in the illustrated embodiment, the battery element 10 having a laminated structure having a plurality of positive electrodes 11 and a plurality of negative electrodes 12 is shown. However, the battery element having the winding structure may have one positive electrode 11 and one negative electrode 12.

Hereinafter, parts constituting the battery element 10 and the electrolyte will be described in detail. In the following description, although not particularly limited, elements in the lithium ion secondary battery will be described.

[1] Negative Electrode

The negative electrode has a structure in which, for example, a negative electrode active material is adhered to a negative electrode current collector by a negative electrode binder, and the negative electrode active material is laminated on the negative electrode current collector as a negative electrode active material layer. Any material capable of absorbing and desorbing lithium ions with charge and discharge can be used as the negative electrode active material in the present embodiment as long as the effect of the present invention is not significantly impaired. Normally, as in the case of the positive electrode, the negative electrode is also configured by providing the negative electrode active material layer on the current collector. Similarly to the positive electrode, the negative electrode may also have other layers as appropriate.

The negative electrode active material is not particularly limited as long as it is a material capable of absorbing and desorbing lithium ions, and a known negative electrode active material can be arbitrarily used. For example, it is preferable to use carbonaceous materials such as coke, acetylene black, mesophase microbead, graphite and the like; lithium metal; lithium alloy such as lithium-silicon, lithium-tin; lithium titanate and the like as the negative electrode active material. Among these, carbonaceous materials are most preferably used from the viewpoint of good cycle characteristics and safety and further excellent continuous charge characteristics. One negative electrode active material may be used alone, or two or more negative electrode active materials may be used in combination in any combination and ratio.

Furthermore, the particle diameter of the negative electrode active material is arbitrary as long as the effect of the present invention is not significantly impaired. However, in terms of excellent battery characteristics such as initial efficiency, rate characteristics, cycle characteristics, etc., the particle diameter is usually 1 μm or more, preferably 15 μm or more, and usually about 50 μm or less, preferably about 30 μm or less. Furthermore, for example, it can be also used as the carbonaceous material such as a material obtained by coating the carbonaceous material with an organic substance such as pitch or the like and then calcining the carbonaceous material, or a material obtained by forming amorphous carbon on the surface using the CVD method or the like. Examples of the organic substances used for coating include coal tar pitch from soft pitch to hard pitch; coal heavy oil such as dry distilled liquefied oil; straight run heavy oil such as atmospheric residual oil and vacuum residual oil, crude oil; petroleum heavy oil such as decomposed heavy oil (for example, ethylene heavy end) produced as a by-product upon thermal decomposition of crude oil, naphtha and the like. A residue obtained by distilling these heavy oil at 200 to 400° C. to result in a solid residue and then pulverizing the solid residue to a size of 1 to 100 μm can also be used as the organic substance. In addition, vinyl chloride resin, phenol resin, imide resin and the like can also be used as the organic substance.

In one embodiment of the present invention, the negative electrode includes a metal and/or a metal oxide and carbon as the negative electrode active material. Examples of the metal include Li, Al, Si, Pb, Sn, In, Bi, Ag, Ba, Ca, Hg, Pd, Pt, Te, Zn, La, and alloys of two or more of these. These metals or alloys may be used as a mixture of two or more. In addition, these metals or alloys may contain one or more non-metal elements.

Examples of the metal oxide include silicon oxide, aluminum oxide, tin oxide, indium oxide, zinc oxide, lithium oxide, and composites of these. In the present embodiment, tin oxide or silicon oxide is preferably contained as the negative electrode active material, and silicon oxide is more preferably contained. This is because silicon oxide is relatively stable and hardly causes reaction with other compounds. Also, for example, 0.1 to 5 mass % of one or more elements selected from nitrogen, boron and sulfur can be added to the metal oxide. In this way, the electrical conductivity of the metal oxide can be improved. Also, the electrical conductivity can be similarly improved by coating the metal or the metal oxide with an electro-conductive material such as carbon by vapor deposition or the like.

Examples of the carbon include graphite, amorphous carbon, diamond-like carbon, carbon nanotube, and composites of these. Highly crystalline graphite has high electrical conductivity and is excellent in adhesiveness with respect to a negative electrode current collector made of a metal such as copper and voltage flatness. On the other hand, since amorphous carbon having a low crystallinity has a relatively small volume expansion, it has a high effect of alleviating the volume expansion of the entire negative electrode, and deterioration due to non-uniformity such as crystal grain boundaries and defects hardly occurs.

The metal and the metal oxide have the feature that the capacity of accepting lithium is much larger than that of carbon. Therefore, the energy density of the battery can be improved by using a large amount of the metal and the metal oxide as the negative electrode active material. In order to achieve high energy density, it is preferable that the content ratio of the metal and/or the metal oxide in the negative electrode active material is high. A larger amount of the metal and/or the metal oxide is preferable, since it increases the capacity of the negative electrode as a whole. The metal and/or the metal oxide is preferably contained in the negative electrode in an amount of 0.01% by mass or more of the negative electrode active material, more preferably 0.1% by mass or more, and further preferably 1% by mass or more. However, the metal and/or the metal oxide has large volume change upon absorbing and desorbing of lithium as compared with carbon, and electrical junction may be lost. Therefore, the amount of the metal and/or the metal oxide in the negative active material is 99% by mass or less, preferably 90% by mass or less, more preferably 80% by mass or less. As described above, the negative electrode active material is a material capable of reversibly absorbing and desorbing lithium ions with charge and discharge in the negative electrode, and does not include other binder and the like.

For example, the negative electrode active material layer may be formed into a sheet electrode by roll-forming the above-described negative electrode active material, or may be formed into a pellet electrode by compression molding. However, usually, the negative electrode active material layer can be formed by applying and drying an application liquid on a current collector, where the application liquid may be obtained by slurrying the above-described negative electrode active material, a binding agent (binder), and various auxiliaries contained as necessary with a solvent.

The negative electrode binder is not particularly limited, and examples thereof include polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, acrylic, acrylic acid, sodium acrylate, polyimide, polyamide imide and the like. In addition to the above, styrene butadiene rubber (SBR) and the like can be included. When an aqueous binder such as an SBR emulsion is used, a thickener such as carboxymethyl cellulose (CMC) can also be used. The amount of the negative electrode binder to be used is preferably 0.5 to 20 parts by mass relative to 100 parts by mass of the negative electrode active material from the viewpoint of a trade-off between "sufficient binding strength" and "high energy". The negative electrode binders may be mixed and used.

As the material of the negative electrode current collector, a known material can be arbitrarily used, and for example, a metal material such as copper, nickel, stainless steel, aluminum, chromium, silver and an alloy thereof is preferably used from the viewpoint of electrochemical stability. Among them, copper is particularly preferable from the viewpoint of ease of processing and cost. It is also preferable that the negative electrode current collector is also subjected to surface roughening treatment in advance. Further, the shape of the current collector is also arbitrary, and examples thereof include a foil shape, a flat plate shape and a mesh shape. A perforated type current collector such as an expanded metal or a punching metal can also be used.

The negative electrode can be produced, for example, by forming a negative electrode active material layer containing a negative electrode active material and a negative electrode binder on a negative electrode current collector. Examples of a method for forming the negative electrode active material layer include a doctor blade method, a die coater method, a CVD method, a sputtering method, and the like. After forming the negative electrode active material layer in advance, a thin film of aluminum, nickel or an alloy thereof may be formed by a method such as vapor deposition, sputtering or the like to obtain a negative electrode current collector.

An electroconductive auxiliary material may be added to a coating layer containing the negative electrode active material for the purpose of lowering the impedance.

Examples of the electroconductive auxiliary material include flaky, sooty, fibrous carbonaceous microparticles and the like such as graphite, carbon black, acetylene black, vapor grown carbon fiber (for example, VGCF (registered trademark) manufactured by Showa Denko K.K.), and the like.

[2] Positive Electrode

The positive electrode refers to an electrode on the high potential side in a battery. As an example, the positive electrode includes a positive electrode active material capable of reversibly absorbing and desorbing lithium ions with charge and discharge, and has a structure in which a positive electrode active material is laminated on a current collector as a positive electrode active material layer integrated with a positive electrode binder. In one embodiment of the present invention, the positive electrode has a charge capacity per unit area of 3 mAh/cm$^2$ or more, preferably 3.5 mAh/cm$^2$ or more. From the viewpoint of safety and the like, the charge capacity per unit area of the positive electrode is preferably 15 mAh/cm$^2$ or less. Here, the charge capacity per unit area is calculated from the theoretical capacity of the active material. That is, the charge capacity of the positive electrode per unit area is calculated by (theoretical capacity of the positive electrode active material used for the positive electrode)/(area of the positive electrode). Note that the area of the positive electrode refers to the area of one surface, not both surfaces of the positive electrode.

The positive electrode active material in the present embodiment is not particularly limited as long as it is a material capable of absorbing and desorbing lithium, and can be selected from several viewpoints. A high-capacity compound is preferably contained from the viewpoint of high energy density. Examples of the high-capacity compound include nickel lithate (LiNiO$_2$) and a lithium nickel composite oxide obtained by partially replacing Ni of nickel lithate with another metal element, and a layered lithium nickel composite oxide represented by formula (A) below is preferable.

$$Li_yNi_{(1-x)}M_xO_2 \quad (A)$$

(provided that 1≤x<1, 0<y≤1.2, and M is at least one element selected from the group consisting of Co, Al, Mn, Fe, Ti, and B.)

From the viewpoint of high capacity, the Ni content is preferably high, or that is to say, x is less than 0.5 in formula (A), and more preferably 0.4 or less. Examples of such compounds include $Li_\alpha Ni_\beta Co_\gamma Mn_\delta O_2$ (0<α≤1.2, preferably 1≤α≤1.2, β+γ+δ=1, β≥0.7, and γ≤0.2) and $Li_\alpha Ni_\beta Co_\gamma Al_\delta O_2$ (0<α≤1.2 preferably 1≤α≤1.2, β+γ+δ=1, β≥0.6 preferably β≥0.7, γ≤0.2), and, in particular, $LiNi_\beta Co_\gamma Mn_\delta O_2$ (0.75≤β≤0.85, 0.05≤γ≤0.15, 0.10≤δ≤0.20). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ can be preferably used.

From the viewpoint of heat stability, it is also preferable that the Ni content does not exceed 0.5, or that is to say, x is 0.5 or more in formula (A). It is also preferable that a certain transition metal does not account for more than half. Examples of such compounds include $Li_\alpha Ni_\beta Co_\gamma Mn_\delta O_2$ (0<β≤1.2 preferably 1≤α≤1.2, β+γ+δ=1, 0.2≤β≤0.5, 0.1≤γ≤0.4). More specific examples include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (provided that these compounds include those in which the content of each transition metal is varied by about 10%).

Also, two or more compounds represented by formula (A) may be used as a mixture, and, for example, it is also preferable to use NCM532 or NCM523 with NCM433 in a range of 9:1 to 1:9 (2:1 as a typical example) as a mixture. Moreover, a battery having a high capacity and a high heat stability can be formed by mixing a material having a high Ni content (x is 0.4 or less) with a material having a Ni content not exceeding 0.5 (x is 0.5 or more, such as NCM433) in formula (A).

Other than the above positive electrode active materials, examples include lithium manganates having a layered structure or a spinel structure, such as $LiMnO_2$, $Li_xMn_2O_4$ (0<x<2), $Li_2MnO_3$, and $Li_xMn_{1.5}Ni_{0.5}O_4$ (0<x<2); $LiCoO_2$ and those obtained by partially replacing these transition metals with other metals; those having an excess of Li based on the stoichiometric compositions of these lithium transition metal oxides; and those having an olivine structure such as $LiFePO_4$. Moreover, materials obtained by partially replacing these metal oxides with Al, Fe, P, Ti, Si, Pb, Sn, In, Bi, Ag, Ba, Ca, Hg, Pd, Pt, Te, Zn, La, or the like can be used as well. One of the positive electrode active materials described above may be used singly, or two or more can be used in combination.

For example, the positive electrode active material layer may be formed into a sheet electrode by roll-forming the above-described positive electrode active material, or may be formed into a pellet electrode by compression molding as in the case of the negative electrode active material layer. However, usually, the positive electrode active material layer can be formed by applying and drying an application liquid on a current collector, where the application liquid may be obtained by slurrying the above-described positive electrode active material, a binding agent (binder), and various auxiliaries contained as necessary with a solvent.

A positive electrode binder similar to the negative electrode binder can be used. Among them, polyvinylidene fluoride or polytetrafluoroethylene is preferable from the viewpoint of versatility and low cost, and polyvinylidene fluoride is more preferable. The amount of the positive electrode binder used is preferably 2 to 15 parts by mass relative to 100 parts by mass of the positive electrode active material from the viewpoint of a trade-off between "sufficient binding strength" and "high energy".

An electroconductive auxiliary material may be added to a coating layer containing the positive electrode active material for the purpose of lowering the impedance. Examples of the conductive auxiliary material include flaky, sooty, fibrous carbonaceous microparticles and the like such as graphite, carbon black, acetylene black, vapor grown carbon fiber (for example, VGCF manufactured by Showa Denko K.K.) and the like.

A positive electrode current collector similar to the negative electrode current collector can be used. In particular, as the positive electrode, a current collector using aluminum, an aluminum alloy, iron, nickel, chromium, molybdenum type stainless steel is preferable.

A conductive auxiliary material may be added to the positive electrode active material layer containing the positive electrode active material for the purpose of reducing impedance. Examples of the conductive auxiliary material include carbonaceous fine particles such as graphite, carbon black, and acetylene black.

[3] Insulating Layer (Material and Manufacturing Method Etc.)

The insulating layer can be formed by applying a slurry composition for an insulating layer so as to cover a part of the active material layer of the positive electrode or the negative electrode and drying and removing a solvent. Although the insulating layer may be formed on only one side of the active material layer, there is an advantage that the warpage of the electrode can be reduced by forming the insulating layer on both side (in particular, as a symmetrical structure).

A slurry for the insulating layer is a slurry composition for forming a porous insulating layer. Therefore, the "insulating layer" can also be referred to as "porous insulating layer". The slurry for the insulating layer comprises non-conductive particles and a binder (or a binding agent) having a specific composition, and the non-conductive particles, the binder and optional components are uniformly dispersed as a solid content in a solvent.

It is desirable that the non-conductive particles stably exist in the use environment of the lithium ion secondary battery and are electrochemically stable. As the non-conductive particles, for example, various inorganic particles, organic particles and other particles can be used. Among them, inorganic oxide particles or organic particles are preferable, and in particular, from the viewpoint of high thermal stability of the particles, it is more preferable to use inorganic oxide particles. Metal ions in the particles sometimes form salts near the electrode, which may cause an increase in the internal resistance of the electrode and a decrease in cycle characteristics of the secondary battery. The other particles include particles to which conductivity is given by surface treatment of the surface of fine powder with a non-electrically conductive substance. The fine powder can be made from a conductive metal, compound and oxide such as carbon black, graphite, $SnO_2$, ITO and metal powder. Two or more of the above-mentioned particles may be used in combination as the non-conductive particles.

Examples of the inorganic particles include inorganic oxide particles such as aluminum oxide, silicon oxide, magnesium oxide, titanium oxide, $BaTiO_2$, ZrO, alumina-silica composite oxide; inorganic nitride particles such as aluminum nitride and boron nitride; covalent crystal particles such as silicon, diamond and the like; sparingly soluble ionic crystal particles such as barium sulfate, calcium fluoride, barium fluoride and the like; clay fine particles such as talc and montmorillonite. These particles may be subjected to element substitution, surface treatment, solid solution treatment, etc., if necessary, and may be used singly or in combination of two or more kinds. Among them, inorganic oxide particles are preferable from the viewpoints of stability in the electrolytic solution and potential stability.

The shape of the non-conductive particles is not particularly limited, and may be spherical, needle-like, rod-like, spindle-shaped, plate-like, or the like.

Examples of the plate-like non-conductive particles, especially inorganic particles, preferably used include various commercially available products such as "SUNLOVELY" ($SiO_2$) manufactured by AGC Si-Tech Co., Ltd., pulverized product of "NST-B 1" ($TiO_2$) manufactured by Ishihara Sangyo Kaisha, Ltd., plate like barium sulfate "H series", "HL series" manufactured by Sakai Chemical Industry Co., Ltd., "Micron White" (Talc) manufactured by Hayashi Kasei Co., Ltd., "Benger" (bentonite) manufactured by Hayashi Kasei Co., Ltd., "BMM" and "BMT" (boehmite) manufactured by Kawaii Lime Industry Co., Ltd., "Serasur BMT-B" [alumina ($Al_2O_3$)] manufactured by Kawaii Lime Industry Co., Ltd., "Serath" (alumina) manufactured by Kinsei Matec Co., Ltd., "AKP series" (alumina) manufactured by Sumitomo Chemical Co., Ltd., and "Hikawa Mica Z-20" (sericite) manufactured by Hikawa Mining Co., Ltd. In addition, $SiO_2$, $Al_2O_3$, and ZrO can be produced by the method disclosed in Japanese Patent Laid-Open No. 2003-206475.

When the shape of the non-conductive particles is spherical, the average particle diameter of the non-conductive particles is preferably in the range of 0.005 to 10 µm, more preferably 0.1 to 5 µm, particularly preferably 0.3 to 2 µm. When the average particle diameter of the non-conductive particles is in the above range, the dispersion state of the porous film slurry is easily controlled, so that it is easy to manufacture a porous film having a uniform and predetermined thickness. In addition, such average particle diameter provides the following advantages. The adhesion to the binder is improved, and even when the porous film is wound, it is possible to prevent the non-conductive particles from peeling off, and as a result, sufficient safety can be achieved even if the porous film is thinned. Since it is possible to suppress an increase in the particle packing ratio in the porous film, it is possible to suppress a decrease in ion conductivity in the porous film. Furthermore, the porous membrane can be made thin.

The average particle diameter size of the non-conductive particles can be obtained by arbitrarily selecting 50 primary particles from an SEM (scanning electron microscope) image in an arbitrary field of view, carrying out image analysis, and obtaining the average value of circle equivalent diameters of each particle.

The particle diameter distribution (CV value) of the non-conductive particles is preferably 0.5 to 40%, more preferably 0.5 to 30%, particularly preferably 0.5 to 20%. By setting the particle diameter distribution of the non-conductive particles within the above range, a predetermined gap between the non-conductive particles is maintained, so that it is possible to suppress an increase in resistance due to the inhibition of movement of lithium. The particle diameter distribution (CV value) of the non-conductive particles can be determined by observing the non-conductive particles with an electron microscope, measuring the particle diameter of 200 or more particles, determining the average particle diameter and the standard deviation of the particle diameter, and calculating (Standard deviation of particle diameter)/(average particle diameter). The larger the CV value means the larger variation in particle diameter.

When the solvent contained in the slurry for insulating layer is a non-aqueous solvent, a polymer dispersed or dissolved in a non-aqueous solvent can be used as a binder. As the polymer dispersed or dissolved in the non-aqueous solvent, polyvinylidene fluoride (PVdF), polytetrafluoroethylene (PTFE), polyhexafluoropropylene (PHFP), polytrifluoroethylene chloride (PCTFE), polyperfluoroalkoxyfluoroethylene, polyimide, polyamideimide, and the like can be used as a binder, and it is not limited thereto.

In addition, a binder used for binding the active material layer can also be used.

When the solvent contained in the slurry for insulating layer is an aqueous solvent (a solution using water or a mixed solvent containing water as a main component as a dispersion medium of the binder), a polymer dispersed or dissolved in an aqueous solvent can be used as a binder. A polymer dispersed or dissolved in an aqueous solvent includes, for example, an acrylic resin. As the acrylic resin, it is preferably to use homopolymers obtained by polymerizing monomers such as acrylic acid, methacrylic acid, acrylamide, methacrylamide, 2-hydroxyethyl acrylate, 2-hydroxyethyl methacrylate, methyl methacrylate, ethylhexyl acrylate, butyl acrylate. The acrylic resin may be a copolymer obtained by polymerizing two or more of the above monomers. Further, two or more of the homopolymer and the copolymer may be mixed. In addition to the above-mentioned acrylic resin, polyolefin resins such as styrene butadiene rubber (SBR) and polyethylene (PE), polytetrafluoroethylene (PTFE), and the like can be used. These polymers can be used singly or in combination of two or more kinds. Among them, it is preferable to use an acrylic resin. The form of the binder is not particularly limited, and particles in the form of particles (powder) may be used as they are, or those prepared in a solution state or an emulsion state may be used. Two or more kinds of binders may be used in different forms.

The insulating layer may contain a material other than the above-described non-conductive filler and binder, if necessary. Examples of such material include various polymer materials that can function as a thickener for a slurry for the insulating layer, which will be described later. In particular, when an aqueous solvent is used, it is preferable to contain a polymer functioning as the thickener. As the polymer functioning as the thickener, carboxymethyl cellulose (CMC) or methyl cellulose (MC) is preferably used.

Although not particularly limited, the ratio of the non-conductive filler to the entire insulating layer is suitably about 70 mass % or more (for example, 70 mass % to 99 mass %), preferably 80 mass % or more (for example, 80 mass % to 99 mass %), and particularly preferably about 90 mass % to 95 mass %.

The ratio of the binder in the insulating layer is suitably about 1 to 30 mass % or less, preferably 5 to 20 mass % or less. In the case of containing an insulating layer-forming component other than the inorganic filler and the binder, for example, a thickener, the content ratio of the thickener is preferably about 10 mass % or less, more preferably about 7 mass % or less. If the ratio of the binder is too small, strength (shape retentivity) of the insulating layer itself and adhesion to the active material layer are lowered, which may cause defects such as cracking and peeling. If the ratio of the binder is too large, gaps between the particles of the insulating layer become insufficient, and the ion permeability in the insulating layer may decrease in some cases.

In order to maintain ion conductivity, the porosity (void ratio) (the ratio of the pore volume to the apparent volume) of the insulating layer is preferably 20% or more, more preferably 30% or more. However, if the porosity is too high, falling off or cracking of the insulating layer due to friction or impact applied to the insulating layer occurs, the porosity is preferably 80% or less, more preferably 70% or less.

The porosity can be calculated from the ratio of the materials constituting the insulating layer, the true specific gravity and the coating thickness.

(Forming of Insulating Layer)

A method of forming the insulating layer will be described. As a material for forming the insulating layer, a paste type material (including slurry form or ink form, the same applies below) mixed and dispersed with an non-conductive filler, a binder and a solvent can be used.

A solvent used for the insulating layer slurry includes water or a mixed solvent mainly containing water. As a solvent other than water constituting such a mixed solvent, one or more kinds of organic solvents (lower alcohols, lower ketones, etc.) which can be uniformly mixed with water can be appropriately selected and used. Alternatively, it may be an organic solvent such as N-methylpyrrolidone (NMP), pyrrolidone, methyl ethyl ketone, methyl isobutyl ketone, cyclohexanone, toluene, dimethylformamide, dimethylacetamide, or a combination of two or more thereof. The content of the solvent in the slurry for the insulating layer is not particularly limited, and it is preferably 40 to 90 mass %, particularly preferably about 50 to 70 mass %, of the entire coating material.

The operation of mixing the non-conductive filler and the binder with the solvent can be carried out by using a suitable kneading machine such as a ball mill, a homodisper, Disper Mill (registered trademark), Clearmix (registered trademark), Filmix (registered trademark), an ultrasonic dispersing machine.

For the operation of applying the slurry for the insulating layer, conventional general coating means can be used without restricting. For example, a predetermined amount of the slurry for the insulating layer can be applied by coating in a uniform thickness by means of a suitable coating device (a gravure coater, a slit coater, a die coater, a comma coater, a dip coater, etc.). When applying the slurry having a high viscosity as in the present embodiment, among these, it is preferable to use the slit coater and the die coater that extrude and apply the slurry with a pump.

Thereafter, the solvent in the slurry for the insulating layer may be removed by drying the coating material by means of a suitable drying means.

(Thickness)

The thickness of the insulating layer is preferably him or more and 30 µm or less, and more preferably 2 µm or more and 15 µm or less.

[4] Electrolyte

The electrolyte includes, but are not particularly limited, a nonaqueous electrolyte which is stable at an operating potential of the battery. Specific examples of the nonaqueous electrolyte include nonprotic organic solvent such as cyclic carbonates such as propylene carbonate (PC), ethylene carbonate (EC), fluoroethylene carbonate (FEC), t-difluoroethylene carbonate (t-DFEC), butylene carbonate (BC), vinylene carbonate (VC), vinylethylene carbonate (VEC); chain carbonates such as allylmethyl carbonate (AMC), dimethyl carbonate (DMC), diethyl carbonate (DEC), ethylmethyl carbonate (EMC), dipropyl carbonate (DPC); propylene carbonate derivative; aliphatic carboxylic acid esters such as methyl formate, methyl acetate, ethyl propionate; cyclic esters such as •-butyrolactone (GBL). The nonaqueous electrolyte may be used singly or a mixture of two or more kinds may be used in combination. Furthermore, sulfur-containing cyclic compound such as sulfolane, fluorinated sulfolane, propane sultone or propene sultone may be used.

Specific examples of support salt contained in the electrolyte include, but are not particularly limited to, lithium salt such as LiPF6, LiAsF6, LiAlCl4, LiClO4, LiBF4, LiSbF6, LiCF3SO3, LiC4F9SO3, Li (CF3SO2)2, LiN (CF3SO2)2. The support salt may be used singly or two or more kinds thereof may be used in combination.

[5] Separator

When the battery element 10 includes the separator 13 between the positive electrode 11 and the negative electrode 12, the separator is not particularly limited, and porous film or non-woven fabric made of such as polypropylene, polyethylene, fluorine-based resin, polyamide, polyimide, polyester, polyphenylene sulfide, polyethylene terephthalate, cellulose, as well as an article in which inorganic substance such as silica, alumina, glass is attached or bonded to a base material made of the above material and an article singly processed from the above material as non-woven fabric or cloth may be used as the separator. The thickness of the separator may be arbitrary. However, from the viewpoint of high energy density, a thin separator is preferable and the thickness can be, for example, 10 to 30 µm.

The present invention is not limited to the above described lithium ion secondary battery and can be applied to any battery. However, since the problem of heat often occurs in batteries with high capacity in many cases, the present invention is preferably applied to batteries with high capacity, particularly lithium ion secondary batteries.

Next, embodiments of method for manufacturing the electrode shown in FIG. 3 will be described. In the following description, the positive electrode 11 and the negative electrode 12 will be described as "electrodes" without particularly distinguishing from each other, but the positive electrode 11 and the negative electrode 12 differ only in the materials, shapes, etc. to be used, and the following explanation will be made on the positive electrode 11 and the negative electrode 12.

The electrode finally has a structure in which the active material layer 111 and the insulating layer 112 are laminated in this order on the current collector 110. Such a laminated structure is manufactured by a method including a step of applying an active material layer slurry on the current collector 110, a step of applying an insulating layer slurry on the active material layer slurry before drying the active material layer slurry, and drying the active material layer slurry and the insulating layer slurry after they are applied to obtain the laminated structure in which the active material layer and the insulating layer are laminated in this order on the current collector. Here, with respect to viscosities of the active material layer slurry and the insulating layer slurry, the viscosity of the active material slurry is 12000 mPa·s or more, and/or the viscosity of the insulating layer slurry is 4000 mPa·s or more when measured at 25° C. with a shear rate of 1/sec. Or the viscosity of the active material layer slurry is 5000 mPa·s or more, and the viscosity of the insulating layer slurry is 4000 mPa·s or more.

By adjusting the viscosity of the active material layer and/or the insulating layer slurry, the mixing of the active material layer and the insulating layer at the interface between both layers is suppressed while forming the active material layer and the insulating layer effectively by applying the insulating layer slurry before the active material layer slurry applied on the current collector is dried. Accordingly, the active material layer and the insulating layer can effectively perform their respective roles without applying the active material layer and the insulating layer thicker than necessary. Specifically, by suppressing the mixing of the active material layer and the insulating layer at the interface between both layers, reduction in charge/discharge capacity and increase in battery resistance of the secondary battery using the obtained electrode are suppressed. Also, the insulation between the electrodes is kept well.

If the viscosity of the active material layer slurry and the insulating layer slurry is too high, it becomes difficult to form the active material layer and the insulating layer with a uniform thickness. Moreover, if the viscosity of the slurry is too high, handling of the slurry will become difficult and the application with a coater will also become difficult. Therefore, in order to ensure the uniformity of the thickness of the active material layer and the insulating layer, and to ensure a coating property with the coater, the viscosity of the active material layer slurry and the insulating layer slurry under the above measurement condition is preferably 200,000 mPa·s or less.

The viscosity defined above is a viscosity supposing the state after the application of the active material layer slurry and the insulating layer slurry. However, if the viscosity during application is too high, the coating property of the active material layer and/or the insulating layer may be reduced. Therefore, it is preferable that the viscosity of the active material layer slurry and/or the insulating layer slurry measured at 25° C. with a shear rate of 5/sec is less than or equal to half of the viscosity measured at 25° C. with a shear rate of 1/sec. Therefore, the fluidity of the active material layer slurry and/or the insulating layer slurry during application is ensured, and efficient application is possible.

In order to more effectively suppress the mixing of the active material layer and the insulating layer, it is preferable to perform cooling at least the surface of the active material layer slurry after applying the active material layer slurry and before applying the insulating layer slurry. The cooling of the active material layer slurry as used herein means that at least the surface of the coated active material layer slurry is brought to the temperature of the coated active material layer slurry (usually, for example, normal temperature of 5 to 35° C.) or less. In a state where at least the surface of the active material layer slurry is cooled, the substantial viscosity of the surface of the active material layer slurry becomes high. By applying the insulating layer slurry on the active material layer slurry in such a state, mixing of the active material layer and the insulating layer can be more effectively suppressed. The coated active material slurry can be cooled by, for example, using a fan or the like to blow cooling air below the temperature of the active material slurry onto the surface of the coated active material slurry.

From the viewpoint of making it difficult to mix the active material layer slurry and the insulating layer slurry at the interface between them, it is preferable to increase the solid content ratio of the insulating layer slurry (for example, 30% or more). By increasing the solid content ratio of the insulating layer slurry, it is promoted to dry the insulating layer slurry before the active material layer slurry and the insulating layer slurry are sufficiently mixed at the interface between them, and as a result, it can be suppressed to mix the active material layer slurry and the insulating layer slurry at the interface between them.

In the process of obtaining a laminated structure, it is preferable that the time from the completion of applying of the insulating layer slurry to the start of drying of the active material slurry and the insulating layer slurry is as short as possible (for example, 10 seconds or less). Also in this case, it is promoted to dry the insulating layer slurry before the active material layer slurry and the insulating layer slurry are sufficiently mixed at the interface between them as described above, and as a result, it can be suppressed to mix the active material layer slurry and the insulating layer slurry at the interface between them.

From the viewpoint of the adhesion between the active material layer and the insulating layer, it is preferable that the active material layer slurry and the insulating layer slurry have the same main component of the binder, the same main component of the solvent or the same main component of both. When at least one of the main component of the binder and the main component of the solvent of the active material layer slurry and the insulating layer slurry is the same, the adhesion between the active material layer and the insulating layer is improved.

Figure 6:
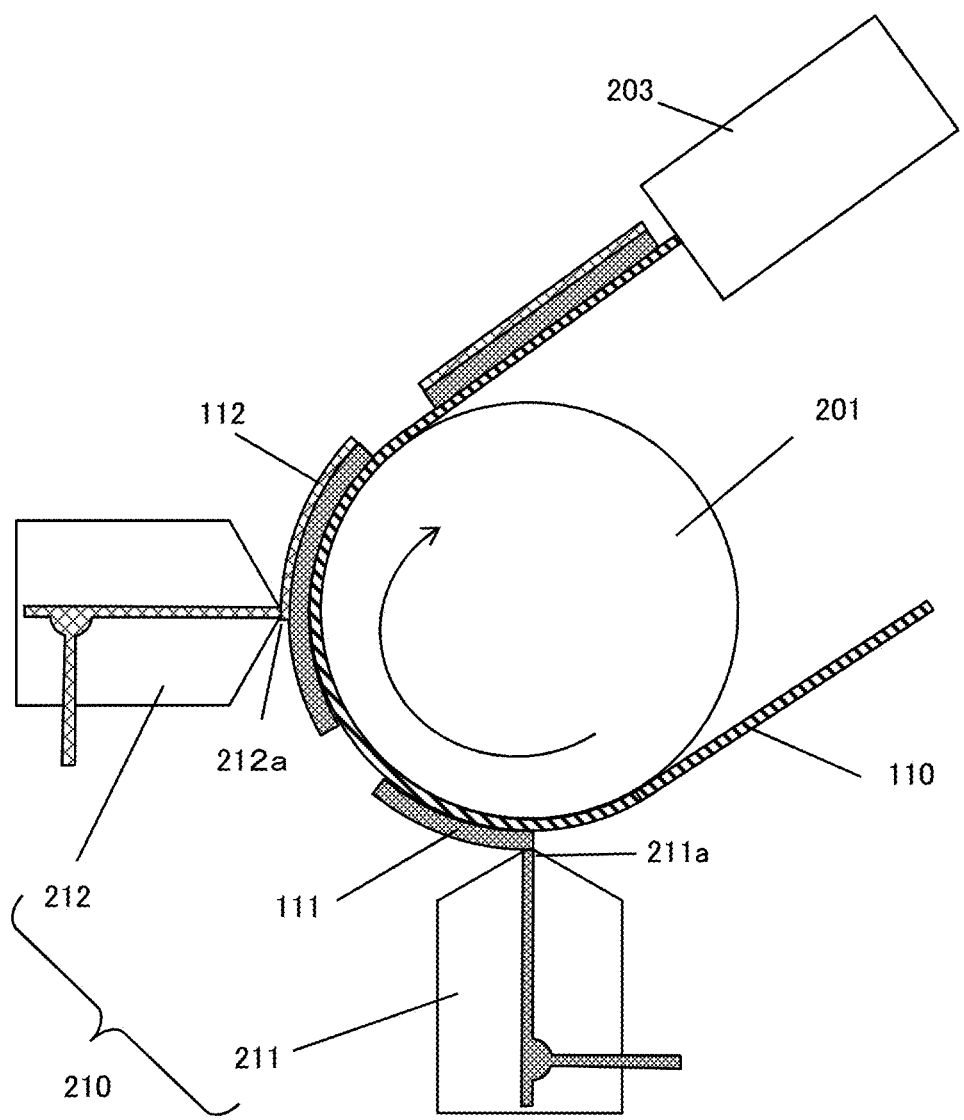
FIG. 6 is a schematic diagram of one embodiment of an electrode manufacturing apparatus for manufacturing an electrode having the structure shown in FIG. 2.

For manufacturing the electrode, for example, the manufacturing apparatus shown in FIG. 6 can be used. The manufacturing apparatus shown in FIG. 6 includes a backup roller 201, a die coater 210 and a drying machine 203.

The backup roller 201 rotates in a state in which the long current collector 110 is wound on the outer peripheral surface of the backup roller 201 whereby the current collector 110 is fed in the rotation direction of the backup roller 201 while the rear surface of the current collector 110 is supported. The die coater 210 has a first die head 211 and a second die head 212 which are spaced from each other in the radial direction and the circumferential direction of the backup roller 201 with respect to the outer circumferential surface of the backup roller 201.

The first die head 211 is for applying the active material layer 111 on the surface of the current collector 110 and is located on the upstream side of the second die head 212 with respect to the feed direction of the current collector 110. A discharge opening 211a having a width corresponding to the applying width of the active material layer 111 is opened at the tip of the first die head 211 facing the backup roller 201. The active material layer slurry is discharged from the discharger opening 211a. The active material layer slurry is prepared by dispersing particles of an active material and a binder (binding agent) in a solvent, and is supplied to the first die head 211.

The second die head 212 is for applying the insulating layer 112 on the surface of the active material layer 111 and is located on the downstream side of the first die head 211 with respect to the feed direction of the current collector 110. A discharge opening 212a having a width corresponding to the applying width of the insulating layer 112 is opened at the tip of the second die head 212 facing the backup roller 201. The insulating layer slurry is discharged from the discharge opening 212a. The insulating layer slurry is prepared by dispersing non-conductive particles and a binder (binding agent) in a solvent, and is supplied to the second die head 212.

A solvent is used for preparing the active material layer slurry and the insulating layer slurry. When N-methyl-2-pyrrolidone (NMP) is used as the solvent, peeling strength of the layer obtained by evaporating the solvent can be increased compared with the case of using an aqueous solvent. When N-methyl-2-pyrrolidone was used as a solvent, the solvent did not evaporate completely even if the solvent was evaporated in a subsequent step, and the obtained layer contains a slight amount of N-methyl-2-pyrrolidone.

The drying machine 203 is for evaporating the solvent from the active material layer slurry and the insulating layer slurry respectively discharged from the first die head 211 and the second die head 212. The slurries are dried by the evaporation of the solvent, whereby the active material layer 111 and an insulating layer 112 are formed.

Next, a manufacturing process of the electrode by means of the manufacturing apparatus shown in FIG. 6 will be described. For convenience of explanation, the active material layer slurry and the active material layer obtained therefrom are described as "active material layer 111" without distinguishing between them. Actually, the "active material layer 111" before drying means the active material layer slurry. Similarly, the "insulating layer 112" before drying means the insulating layer slurry.

Figure 6A:
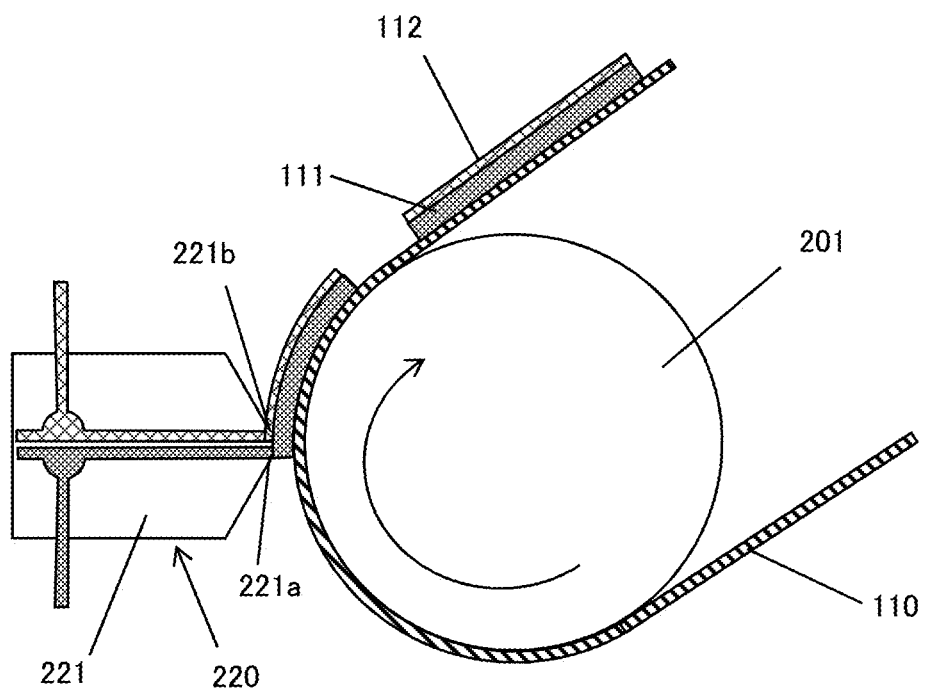
FIG. 6A is a schematic diagram of another embodiment of the electrode manufacturing apparatus.

First, the active material layer 111 slurried with a solvent is intermittently applied to the surface of the long current collector 110 supported and fed on the backup roller 201 by using the first die head 211. As a result, as shown in FIG. 6A, a slurry of the active material layer 111 is applied to the current collector 110 at intervals in the feeding direction A of the current collector 110. By intermittently applying the active material layer 111 with the first die head 211, the active material layer 111 is applied in a rectangular shape having a longitudinal length parallel to the feeding direction A of the current collector 110 and a lateral length along a direction orthogonal thereto.

Next, when the leading end of the applied active material layer 111 in the feeding direction of the current collector 110 is fed to a position facing the discharge opening 212a of the second die head 212, the insulating layer 112 slurried with solvent is intermittently applied to the active material layer 111 by using the second die head 212. The insulating layer 112 is applied before the active material layer 111 is dried, that is, before the solvent of the active material layer 111 is evaporated. By intermittently applying the insulating layer 112 with the second die head 212, the insulating layer 112 is applied in a rectangular shape having a longitudinal length parallel to the feeding direction A of the current collector 110 and a lateral length along a direction perpendicular thereto.

In the present embodiment, the first die head 211 and the second die head 212 have the same width (the dimension in the direction orthogonal to the feeding direction A of the current collector 110) of the discharge openings 211a and 212a, and the active material layer 111 and the insulating layer 112 have the same applying width.

After applying the active material layer 111 and the insulating layer 112, the current collector 110 is fed to the drying machine 203, the solvents of the active material layer slurry and the insulating layer slurry are evaporated in the drying machine 203. Thus, the flurry for the active material layer and the insulating layer slurry are dried. After evaporation of the solvent, the current collector 110 is fed to a roll press where the active material layer 111 and the insulating layer 112 are compression-molded. Thus, the active material layer 111 is formed simultaneously with the formation of the insulating layer 112.

Finally, the current collector 110 is cut into a desired shape by an appropriate method such as punching. The electrode is thereby obtained. The cutting step may be carried out so as to obtain a desired shape by one time of processing or it may be carried out so as to obtain a desired shape by a plurality of times of processing.

Although the present invention has been described with reference to one embodiment, the present invention is not limited to the above-described embodiments, and can be arbitrarily changed within the scope of the technical idea of the present invention.

For example, in the above embodiment, in order to apply the active material layer 111 and the insulating layer 112, a die coater 210 having two die heads 211 and 212 with discharge openings 211a and 212a as shown in FIG. 6 was used. However, as shown in FIG. 6A, the active material layer 111 and the insulating layer 112 can be applied to the current collector 110 by using a die coater 220 having a single die head 221 with two discharge openings 221a and 221b.

The two discharge openings 221a and 221b are arranged at intervals in the rotation direction of the backup roller 201, that is, the feed direction of the current collector 110. The active material layer slurry is applied by the discharge opening 221a located on the upstream side in the feed direction of the current collector 110 and the insulating layer slurry is applied by the discharge opening 221b located on the downstream side. Therefore, the active material layer slurry and the insulating layer slurry are discharged respectively from the two discharge openings 221a and 221b, thereby it is possible to obtain a structure that the active material layer 111 is intermittently applied to the surface of the current collector 110 and the insulating layer 112 is applied to the surface of the active material layer 111.

Figure 6B:
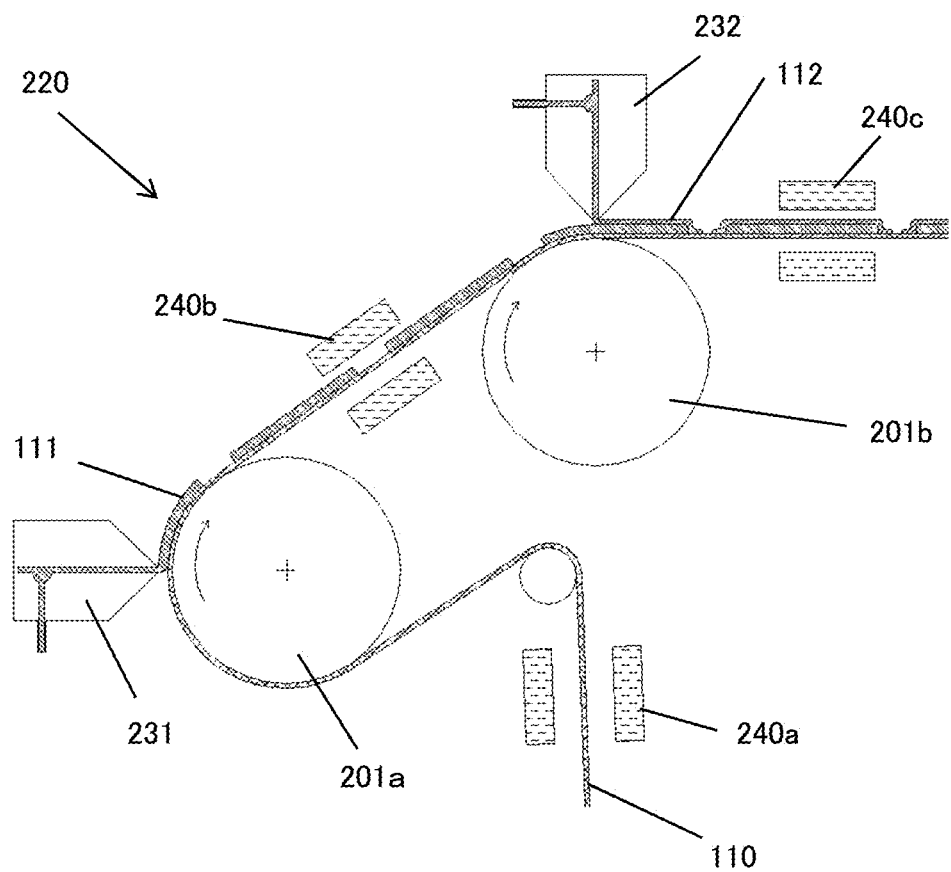
FIG. 6B is a schematic diagram of another embodiment of the electrode manufacturing apparatus.

As still another embodiment of the die coater, a die coater 220 shown in FIG. 6B can also be used. The die coater 220 shown in FIG. 6B has a first backup roller 201a and a second backup roller 201b, and a first die head 231 and a second die head 232 are arranged corresponding to each of them. The active material layer 111 is applied by the first die head 231 located on the upstream side of the transport direction of the current collector 110, and the insulating layer 112 is applied by the second die head 232 located on the downstream side. Even with such a configuration, it can be obtained a structure in which the active material layer 111 is intermittently applied to the surface of the current collector 110 and the insulating layer 112 is applied to the surface of the active material layer 111.

When the die coater 220 having a plurality of backup rollers 201a and 201b as shown in FIG. 6B is used, it can be arranged a first sensor 240a located upstream of the first backup roller 201a, a second sensor 240b between the first backup roller 201a and the second backup roller 201b and a third sensor 240c located downstream of the second backup roller 201b. These sensors 240a, 240b, and 240c can be film thickness meters, for example, and thereby the thickness of the active material layer 111 and the thickness of the insulating layer 112 can be measured. The thickness of the active material layer 111 can be obtained from the difference between the measurement result by the second sensor 240b and the measurement result by the first sensor 240a, and the thickness of the insulating layer 112 can be obtained from the difference between the measurement result obtained by the third sensor 240c and the measurement result obtained by the second sensor 240b.

As the film thickness meter, a known film thickness meter such as a radiation ($\alpha$-ray, $\gamma$-ray, X-ray) film thickness meter and a laser film thickness meter can be used. The film thickness meter is desirably a non-contact type. In addition, either a reflection type or a transmission type can be used as the film thickness meter.

Furthermore, in the above embodiment, the case where the active material layer 111 and the insulating layer 112 are applied to one side of the current collector 110 has been described. However, it is possible to manufacture an electrode having the active material layer 111 and the insulating layer 112 on both surface of the current collector 110 by applying the active material layer 111 and the insulating layer 112 on the other side of the current collector 110 in a similar manner. After the active material layer 111 and the insulating layer 112 are formed on both surfaces of the current collector 110, the current collector 110 is fed to a roll press machine, where the active material layer 111 and the insulating layer 112 are compressed.

In the above embodiment, the case where the first layer is the active material layer and the second layer is the insulating layer has been described for the electrode and the manufacturing method thereof. However, the combination of the first layer and the second layer is not limited.

For example, the first layer can be a high adhesion active material layer in which the amount of the binder is increased than usual, and the second layer can be a high energy density active material layer. With such a layer structure, it is possible to improve the energy density of the battery while suppressing the falling off of the active material layer from the current collector. When the first layer is a low-resistance active material layer in which the amount of the conductive material is increased than usual, or a conductive layer made of a conductive material and a binder, and the second layer is a high energy density active material layer, both the energy density and the charge/discharge output density of the battery can be improved.

Further, the battery obtained by the present invention can be used in various uses. Some examples are described below.

[Battery Pack]

A plurality of batteries can be combined to form a battery pack. For example, the battery pack may have a configuration in which two or more batteries according to the present embodiment are connected in series and/or in parallel. The series number and parallel number of the batteries can be appropriately selected according to the intended voltage and capacity of the battery pack.

[Vehicle]

Figure 7:
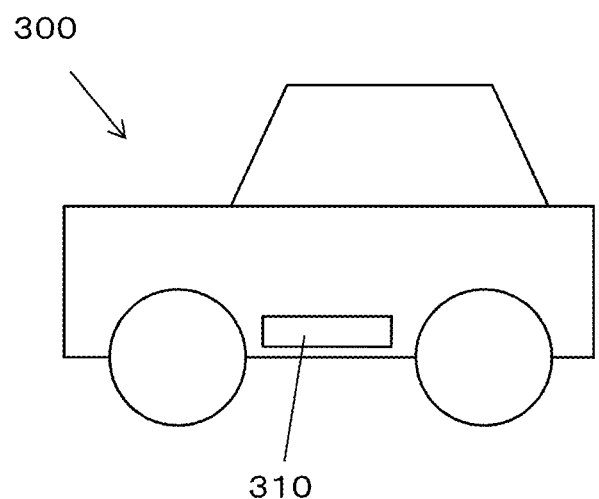
FIG. 7 is a schematic view showing an embodiment of an electric vehicle equipped with a secondary battery.

The above-described battery or the battery pack thereof can be used for a vehicle. Examples of vehicles that can use batteries or assembled batteries include hybrid vehicles, fuel cell vehicles, and electric vehicles (four-wheel vehicles (commercial vehicles such as passenger cars, trucks and buses, and mini-vehicles, etc.), motorcycles (motorbike and tricycles). Note that the vehicle according to the present embodiment is not limited to an automobile, and the battery can also be used as various power sources for other vehicles, for example, transportations such as electric trains. As an example of such a vehicle, FIG. 7 shows a schematic diagram of an electric vehicle. The electric vehicle 300 shown in FIG. 7 has a battery pack 310 configured to satisfy the required voltage and capacity by connecting a plurality of the above-described batteries in series and in parallel.

[Power Storage Device]

Figure 8:
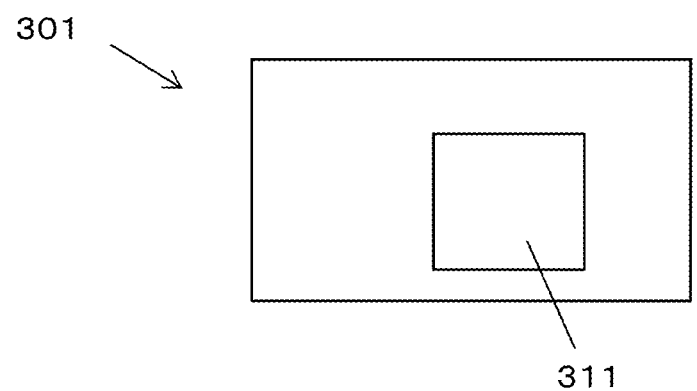
FIG. 8 is a schematic diagram showing an example of a power storage device equipped with a secondary battery.

The above-described battery or the battery pack thereof can be used for a power storage device. Examples of the power storage device using the secondary battery or the battery pack thereof include a power storage device which is connected between a commercial power supply supplied to an ordinary household and a load such as a household electric appliance to use as a backup power source or an auxiliary power source in case of power outage, and a power storage device used for large-scale electric power storage for stabilizing electric power output with large time variation due to renewable energy such as photovoltaic power generation. An example of such a power storage device is schematically shown in FIG. 8. The power storage device 301 shown in FIG. 8 has a battery pack 311 configured to satisfy a required voltage and capacity by connecting a plurality of the above-described batteries in series and in parallel.

[Others]

Furthermore, the above-described battery or the battery pack thereof can be used as a power source of a mobile device such as a mobile phone, a notebook computer and the like.

Experimental Examples

A plurality of simulated positive electrodes in which a positive electrode active material layer is formed as a first layer on a current collector and an insulating layer is formed as a second layer were prepared under conditions in which a viscosity of an active material layer slurry and a viscosity of an insulating layer slurry were different from each other when the slurries were applied. The experiment was performed under two applying conditions (applying condition A and applying condition B) by changing a slurry discharge rate and an applying speed during applying.

[Preparation of Positive Electrode Active Material Layer Slurry]

Lithium nickel composite oxide ($LiNi_{0.80}Mn_{0.15}Co_{0.05}O_2$) as a positive electrode active material, carbon black as a conductive auxiliary, and polyvinylidene fluoride as a binder were weighed at a mass ratio of 90:5:5, and they were kneaded using N-methyl pyrrolidone as a solvent to prepare positive electrode active material layer slurries. As shown in Table 1, five types of positive electrode active material layer slurries having different viscosities for each applying condition were prepared by changing mixing ratio of the solvent. The viscosities shown in Table 1 are those measured at a temperature of 25° C. and a shear rate of 1 (/sec). A rotational viscometer DV-II+Pro supplied from BROOK FIELD was used for viscosity measurement.

TABLE 1

|  |  | Viscosity (mPa · s) |
|---|---|---|
| For applying condition A | Positive electrode active material layer slurry 1 | 98200 |
|  | Positive electrode active material layer slurry 2 | 51000 |
|  | Positive electrode active material layer slurry 3 | 12600 |
|  | Positive electrode active material layer slurry 4 | 5400 |
|  | Positive electrode active material layer slurry 5 | 1200 |
| For applying condition B | Positive electrode active material layer slurry 11 | 67000 |
|  | Positive electrode active material layer slurry 12 | 18000 |
|  | Positive electrode active material layer slurry 13 | 12000 |
|  | Positive electrode active material layer slurry 14 | 7500 |
|  | Positive electrode active material layer slurry 15 | 3000 |

[Preparation of Insulating Layer Slurry]

Alumina (AKP-3000 manufactured by Sumitomo Chemical Co., Ltd.) and polyvinylidene fluoride (PVdF) as a binder were weighed in a weight ratio of 90:10 and kneaded using N-methylpyrrolidone as a solvent to prepare insulating layer slurries. As shown in Table 2, five types of insulating layer slurries having different viscosities for each applying condition were prepared by changing mixing ratio of the solvent. The measurement conditions of the viscosity are the same as in the case of the positive electrode active material slurry.

TABLE 2

|  |  | Viscosity (mPa · s) |
|---|---|---|
| For applying condition A | Insulating layer slurry 1 | 16300 |
|  | Insulating layer slurry 2 | 9400 |
|  | Insulating layer slurry 3 | 4400 |
|  | Insulating layer slurry 4 | 2300 |
|  | Insulating layer slurry 5 | 1100 |
| For applying condition B | Insulating layer slurry 11 | 76000 |
|  | Insulating layer slurry 12 | 34000 |
|  | Insulating layer slurry 13 | 10000 |
|  | Insulating layer slurry 14 | 6000 |
|  | Insulating layer slurry 15 | 2000 |

[Preparation of Samples (Positive Electrodes)]

An aluminum foil having a thickness of 20 µm was prepared as a current collector. The positive electrode active material layer slurry is applied on the aluminum foil, the insulating layer slurry is applied on the positive electrode active material layer slurry before the positive electrode active material layer slurry is dried, and they were dried to prepare a plurality of simulated samples of the positive electrode. A plurality of types of simulated samples were prepared by changing the combination of the positive electrode active material layer slurry and the insulating layer slurry for each coating condition.

A two-head die coater having two die heads was used for applying the positive electrode active material layer slurry and the insulating layer slurry. The applying amount of the positive electrode active material layer slurry was 10 mg/cm$^2$. The applying amount of the insulating layer slurry was 2 mg/cm$^2$. Two applying conditions having different applying rates were used, but the applying amount was the same in applying condition A and applying condition B. The applying rates were 2 m/min in applying condition A and 4 m/min in applying condition B. Only when the insulating layer slurry 1 (viscosity 16300 mPa·s) was used, applying was performed at a applying rate slower than the other coating conditions A.

[Evaluation (Applying Condition A)]

(Insulation Property)

Insulating property was evaluated for a plurality of types of simulated samples prepared under applying condition A. The evaluation of insulation property was performed by checking electrical conduction between the lowermost aluminum foil and the uppermost insulating layer with a tester at 10 points for each simulated sample. It is considered that as the number of points where the electro conduction is larger, there are more locations where internal short circuit has occurred. Therefore, the insulating property was evaluated in the following three stages according to the number of points where insulation was maintained.

7-10 points: ○

3-6 points: Δ

0-2 points: x

Figure 9:
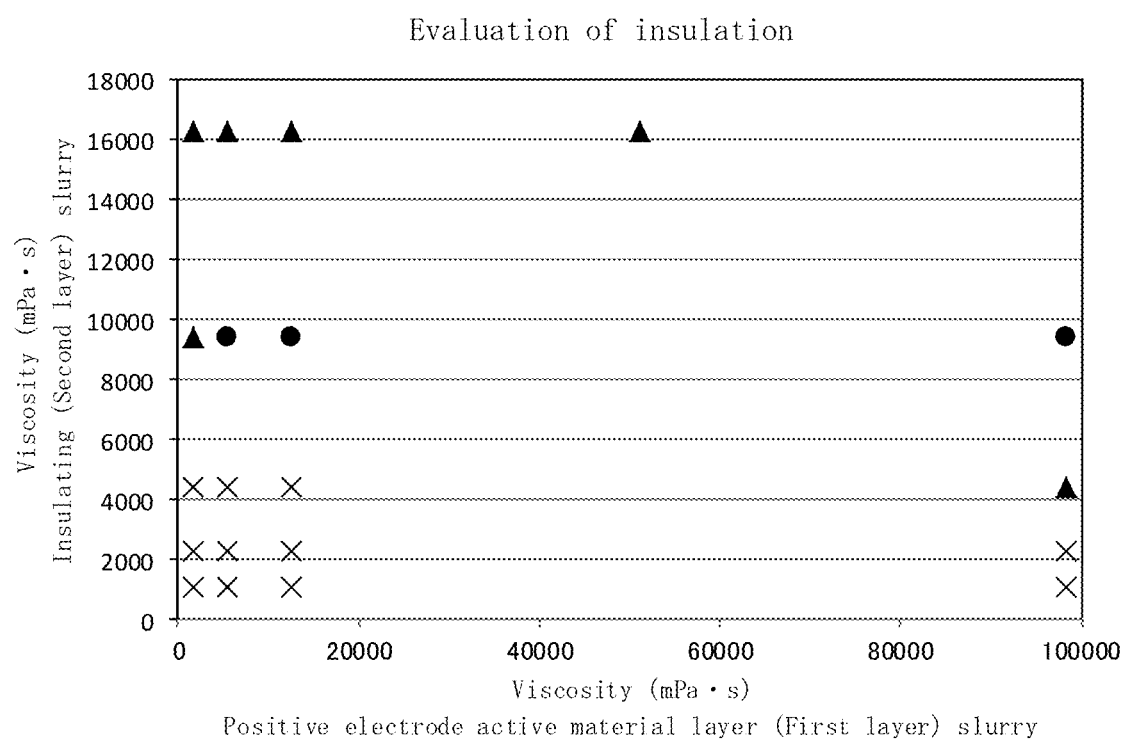
FIG. 9 is a graph showing insulation evaluation results according to the experimental example of the present invention.

The combinations of the slurries in the simulated samples and the evaluation results are shown in Table 3 and the graph of FIG. 9.

TABLE 3

| Evaluation of insulation property |  | Insulating layer slurry No. (Viscosity: mPa · s) | | | | |
|---|---|---|---|---|---|---|
|  |  | 1 (16300) | 2 (9400) | 3 (4400) | 4 (2300) | 5 (1100) |
| Positive electrode active material layer slurry No. (Viscosity: mPa · s) | 1 (98200) |  | ○ | Δ | x | x |
|  | 2 (51000) | Δ |  |  |  |  |
|  | 3 (12600) | Δ | ○ | x | x | x |
|  | 4 (5400) | Δ | ○ | x | x | x |
|  | 5 (1650) | Δ | Δ | x | x | x |

(Mixing Degree of First Layer/Second Layer)

For the prepared simulated samples, a composition analysis on the surface of simulated samples (the surface of the insulating layer) was performed by an EDX (energy dispersive X-ray spectroscopy) to examine a ratio of the metal (Ni, Co, Mn) contained in the active material layer to the metal (Al, Ni, Co, Mn) detected on the surface of the insulating layer. In the EDX, a metal existing to a certain depth from the surface is detected. Therefore, the more metal contained in the active material layer below the insulating layer is detected (the above ratio is higher), the greater the unevenness at the interface between the insulating layer and the active material layer, and a mixing degree between the insulating layer and the active material layer is large. Thus, the above ratio can be used as an index of the mixing degree between the insulating layer and the active material layer.

In the structure manufactured by the conventional method of applying the insulating layer after applying and drying the active material layer, the ratio of the metal contained in the active material layer to the detected metal is approximately 6%. Therefore, in an evaluation of the mixing degree of the active material layer/the insulating layer, the mixing degree (M) was evaluated in the following three stages based on the value of 6%.

M≤6%: ○
6%<M≤8%: Δ
8%<M: x

Figure 10:
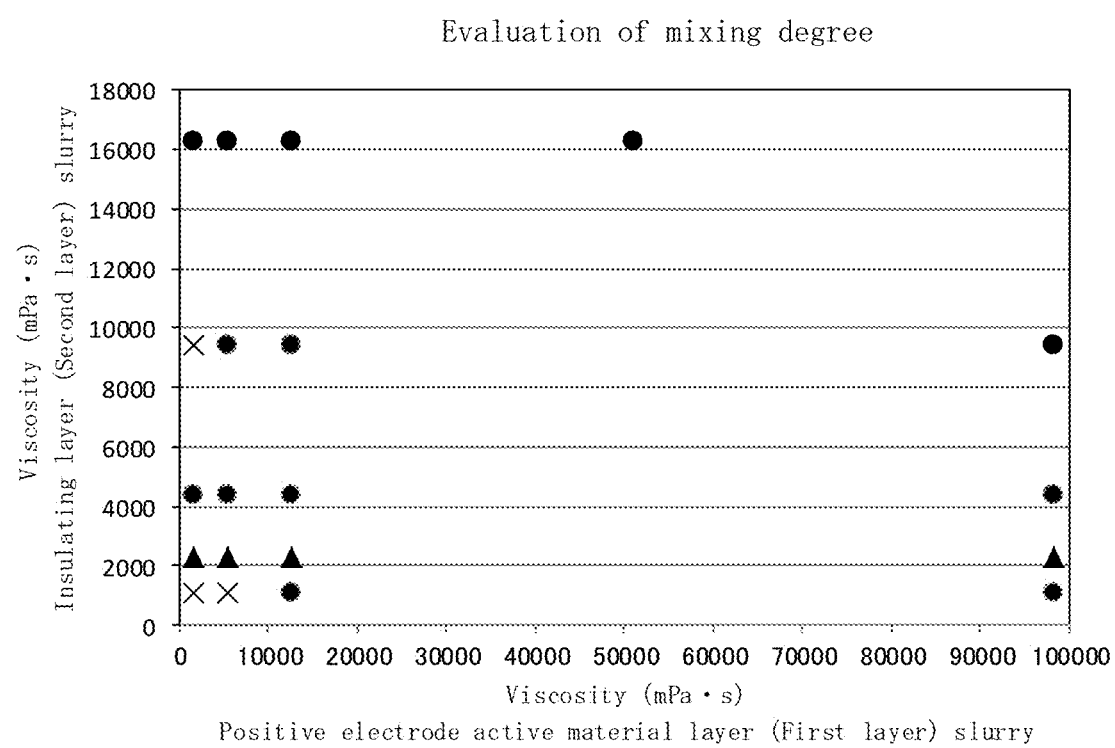
FIG. 10 is a diagram showing results of evaluating the degree of mixing according to the experimental example of the present invention.

The combinations of the slurries in the simulated samples and the evaluation results are shown in Table 4 and the graph of FIG. 10.

TABLE 4

| Evaluation of mixing degree | | Insulating layer slurry No. (Viscosity: mPa · s) | | | | |
|---|---|---|---|---|---|---|
| | | 1 (16300) | 2 (9400) | 3 (4400) | 4 (2300) | 5 (1100) |
| Positive electrode active material layer slurry No. (Viscosity: mPa · s) | 1 (98200) | | ○ | ○ | Δ | ○ |
| | 2 (51000) | ○ | | | | |
| | 3 (12600) | ○ | ○ | ○ | Δ | ○ |
| | 4 (5400) | ○ | ○ | ○ | Δ | x |
| | 5 (1650) | ○ | x | ○ | Δ | x |

From the above, the following can be generally found by comprehensively considered the evaluation results of the insulation property and the mixing degree.

When the viscosity of the positive electrode active material layer slurry as the first layer is 12000 (mPa·s) or more and/or the viscosity of the insulating layer as the second layer is 4000 (mPa·s) or more, mixing of the positive electrode active material layer and the insulating layer is suppressed and good insulation between the surface of the insulating layer and the current collector is maintained. Further, when the viscosity of the insulating layer slurry is 4000 (mPa·s) or more, the above effect can be sufficiently exhibited if the viscosity of the positive electrode active material slurry is 5000 (mPa·s) or more. Furthermore, as can be seen from Table 3, from the viewpoint of insulating properties, the viscosity of the insulating layer slurry is preferably 9400 (mPa·s) or more.

In addition, in the case where the viscosity of the insulating layer slurry is 4400 (mPa·s), there are cases where good results are obtained in the evaluation of mixing degree but not so good in the evaluation of insulation property. Considering that good results are obtained in the evaluation of mixing degree, the reason for this is presumed that the internal short circuit does not occur over all but, for example, there are places where the active material layer slurry has a high viscosity and the active material has passed through the insulating layer.

[Evaluation of Insulation Property (Applying Condition B)]

Insulating property was evaluated for a plurality of types of simulated samples prepared under applying condition B. As in the case of applying condition A, the evaluation of insulation property was performed by checking electrical conduction between the lowermost aluminum foil and the uppermost insulating layer with a tester at 20 points for each simulated sample. The insulating property was evaluated in the following three stages according to the number of points where insulation was maintained among 20 points.

14-20 points: ○
6-13 points: Δ
0-5 points: x

The combinations of the slurries in the simulated samples and the evaluation results are shown in Table 5. Compared with the case of applying condition A, the discharge of the slurry from the discharge opening was stable when the high-viscosity insulating layer slurry was used. By increasing the discharge rate, the viscosity of the slurry, which is a pseudoplastic fluid, is decreased, and the smoothness of the applied layer is increased as the fluidity increased.

From the viewpoint of insulation property, the applying rate is preferably 2 m/min or more.

TABLE 5

| Evaluation of insulation property (insulation ratio) (applying condition B) | | Insulating layer slurry No. (Viscosity: mPa · s) | | | | |
|---|---|---|---|---|---|---|
| | | 11 (76000) | 12 (34000) | 13 (10000) | 14 (6000) | 15 (2000) |
| Positive electrode active material layer slurry No. (Viscosity: mPa · s) | 11 (67000) | ○ | ○ | ○ | ○ | ○ |
| | 12 (18000) | ○ | ○ | ○ | Δ | x |
| | 13 (12000) | ○ | Δ | Δ | Δ | x |
| | 14 (7500) | Δ | Δ | Δ | Δ | x |
| | 15 (3000) | Δ | Δ | x | x | x |

It can be seen that the insulation between the surface of the insulating layer and the current collector is maintained good when the viscosity of the insulating layer slurry as the second layer is 6000 (mPa·s) or more, preferably 10,000 (mPa·s) or more, more preferably 76000 (mPa·s) or more. In addition, when the viscosity of the insulating layer slurry is 10,000 (mPa·s) or more, it can be seen that the insulation is maintained good when the viscosity of the positive electrode active material layer slurry is 12000 (mPa·s) or more. In particular, when the viscosity of the positive electrode active material layer slurry is 67000 (mPa·s) or more, it can be seen that the insulation between the surface of the insulating layer and the current collector is maintained good even if, for example, the viscosity of the slurry for the insulating layer is as low as 2000 (mPa·s).

[Examination of Insulating Layer Composition]

In the insulating layer slurry in Table 2, alumina and binder were 90:10, but the case where this ratio was changed was also examined.

[Preparation of Insulating Layer Slurry]

Alumina (AKP-3000 manufactured by Sumitomo Chemical Co., Ltd.) and polyvinylidene fluoride (PVdF) as a binder were weighed in a weight ratio (hereinafter referred to as composition ratio) of 95:5, 97:3 and 99:1, mixed with N-methylpyrrolidone as a solvent having approximately the same mass as the solid content, and kneaded to obtain an insulating layer slurry. Thereby, as shown in Table 6, three types of insulating layer slurries having different compositions were prepared. The measurement conditions of the viscosity were the same as in the case of the positive electrode active material layer slurry.

TABLE 6

| | | Alumina:PVdF Composition ratio | Viscosity (mPa·s) |
|---|---|---|---|
| For examination of composition | Insulating layer slurry 21 | 95:5 | 80,000 |
| | Insulating layer slurry 22 | 97:3 | 110,000 |
| | Insulating layer slurry 23 | 99:1 | 30,000 |

Using the positive electrode active material layer slurry 11 shown in Table 1 as the positive electrode active material layer slurry, simulated samples were prepared in the same manner as described above. The applying condition was applying condition B. In the evaluation of insulation property, as described above, the electro conduction was checked with a tester at 10 points for each simulated sample, and the ratio of the points where insulation was maintained among 10 points was defined as "insulation ratio". In addition, the surface of the simulated sample was observed. For the sample in which the crack was observed, the maximum crack width among the observed cracks was measured. In this experimental example, the width of the crack means the length of the crack in a direction perpendicular to the extending direction of the crack. These results are shown in Table 7.

TABLE 7

| | Alumina:PVdF Composition ratio | Insulation ratio | Surface maximum crack width |
|---|---|---|---|
| Insulating layer slurry 21 | 95:5 | 90% | No crack |
| Insulating layer slurry 22 | 97:3 | 100% | 0.7 mm |
| Insulating layer slurry 23 | 99:1 | 100% | 1.3 mm |

As can be seen from Table 7, even if the PVdF ratio in the solid content, that is, the mass ratio of the binder in the insulating layer is reduced to 5%, 3%, and 1%, the simulated samples had good insulation property, although some cracks were observed on the surface. From this, it can bee seen that good insulation property can be obtained even if the mass ratio of the binder in the insulating layer is reduced as long as the slurry having the preferable viscosity described above is used. From the viewpoint of cracks, it can be seen that the mass ratio of the binder in the insulating layer is preferably 1% or more, more preferably 3% or more, and even more preferably 5% or more.

FURTHER EXEMPLARY EMBODIMENTS

The present invention has been described in detail above. The present specification discloses the inventions described in the following further exemplary embodiments. However, the disclosure of the present specification is not limited to the following further exemplary embodiments.

Further Exemplary Embodiment 1

A method for manufacturing an electrode for a secondary batter, the electrode being used as a positive electrode and a negative electrode of the secondary battery, the method comprising:

applying a first layer slurry to a surface of a current collector, applying a second layer slurry on the first layer slurry before the first layer slurry is dried, and drying the first layer slurry and the second layer slurry after applying the first layer slurry and the second layer slurry to obtain a laminated structure in which a first layer and a second layer are laminated in this order on the current collector, wherein a viscosity of the first layer slurry is 12000 mPa·s or more, and/or a viscosity of the second layer slurry is 4000 mPa·s or more when the viscosities of the first layer slurry and the second layer slurry are measured at 25° C. with a shear rate of 1/sec.

Further Exemplary Embodiment 2

The method for manufacturing the electrode for the secondary battery according to Further exemplary embodiment 1, wherein the viscosity of the second layer slurry is 4000 mPa·s or more and the viscosity of the first layer slurry is 5000 mPa·s or more.

Further Exemplary Embodiment 3

The method for manufacturing the electrode for the secondary battery according to Further exemplary embodiment 1 or 2, wherein a viscosity of the first layer slurry and/or the second layer slurry measured at 25° C. with a shear rate of 5/sec is less than or equal to half of the viscosity measured at 25° C. with the shear rate of 1/sec.

Further Exemplary Embodiment 4

The method for manufacturing the electrode for the secondary battery according to anyone of Further exemplary embodiments 1 to 3, wherein the first layer is an active material layer and the second layer is an insulating layer.

Further Exemplary Embodiment 5

The method for manufacturing the electrode for the secondary battery according to anyone of Further exemplary embodiments 1 to 3, wherein the first layer is a high adhesion active material layer, a low-resistance active material layer or a conductive layer.

Further Exemplary Embodiment 6

The method for manufacturing the electrode for the secondary battery according to anyone of Further exemplary embodiments 1 to 5, wherein the first layer slurry and the second layer slurry include a main material, a binder and a solvent.

Further Exemplary Embodiment 7

The method for manufacturing the electrode for the secondary battery according to Further exemplary embodiment 6, wherein the first layer slurry and the second layer slurry have same main component of the binder.

Further Exemplary Embodiment 8

The method for manufacturing the electrode for the secondary battery according to Further exemplary embodiment 6 or 7, wherein the first layer slurry and the second layer slurry have same main component of the solvent.

Further Exemplary Embodiment 9

The method for manufacturing the electrode for the secondary battery according to anyone of Further exemplary embodiments 1 to 8, further comprising:
cooling at least a surface of the first layer slurry after applying the first layer slurry and before applying the second layer slurry.

Further Exemplary Embodiment 10

The method for manufacturing the electrode for the secondary battery according to anyone of Further exemplary embodiments 1 to 9, wherein a solid content ratio of the second layer slurry is 30% or more.

Further Exemplary Embodiment 11

The method for manufacturing the electrode for the secondary battery according to anyone of Further exemplary embodiments 1 to 10, wherein a time from a completion of applying of the second layer slurry to a start of drying of the second layer slurry is 10 seconds or less in obtaining the laminated structure.

Further Exemplary Embodiment 12

A method for manufacturing a second battery comprising:
manufacturing a positive electrode and a negative electrode by the method for manufacturing according to anyone of Further exemplary embodiments 1 to 11,
arranging the positive electrode and the negative electrode facing each other to configure a battery element, and
enclosing the battery element together with an electrolyte in a casing.

INDUSTRIAL APPLICABILITY

The secondary battery according to the present invention can be used for all industrial fields requiring power sources and industrial fields related to transportation, storage and supply of electrical energy. More specifically, the battery according to the present invention can be used for power sources for mobile devices such as cellular phone, notebook personal computer; power sources for electric vehicles including electric car, hybrid car, electric motorcycle, power assist bicycle, and transfer/transportation media of trains, satellites and submarines; backup power sources for UPS or the like; electric storage facilities for storing electric power generated by photovoltaic power generation, wind power generation or the like.

EXPLANATION OF SYMBOLS

10 Battery element
10a Positive electrode tab
10b Negative electrode tab
11 Positive electrode
12 Negative electrode
13 Separator
31 Positive electrode terminal
32 Negative electrode terminal
110 Current collector
110a Extended portion
111 Active material layer
112 Insulating layer

The invention claimed is:
1. A method for manufacturing an electrode for a secondary battery, the electrode being used as a positive electrode and a negative electrode of the secondary battery, the method comprising:
applying a first layer slurry to a surface of a current collector,
applying a second layer slurry on the first layer slurry before the first layer slurry is dried, and
drying the first layer slurry and the second layer slurry after applying the first layer slurry and the second layer slurry to obtain a laminated structure in which a first layer is laminated on the current collector and a second layer is laminated on the first layer,
wherein (i) a viscosity of the first layer slurry is 12000 mPa·s or more, or (ii) the viscosity of the first layer slurry is 12000 mPa·s or more and a viscosity of the second layer slurry is 4000 mPa·s or more, at 25° C. with a shear rate of 1/sec,
wherein the first layer slurry is an active material slurry, the first layer is an active material layer, the second layer slurry is an insulating layer slurry, and the second layer is an insulating layer, and
wherein the second layer slurry includes non-conductive particles.

2. The method for manufacturing the electrode for the secondary battery according to claim 1, wherein a viscosity of the first layer slurry and/or the second layer slurry measured at 25° C. with a shear rate of 5/sec is less than half of the viscosity measured at 25° C. with the shear rate of 1/sec.

3. The method for manufacturing the electrode for the secondary battery according to claim 1, wherein the first layer slurry and the second layer slurry include a main material, a binder and a solvent, the main material of the first layer slurry is active material, and the main material of the second layer slurry is non-conductive particles.

4. The method for manufacturing the electrode for the secondary battery according to claim 3, wherein the binder of the first layer slurry and the second layer slurry have a common component.

5. The method for manufacturing the electrode for the secondary battery according to claim 3, wherein the solvent of the first layer slurry and the second layer slurry have a common component.

6. The method for manufacturing the electrode for the secondary battery according to claim 1, further comprising:
cooling at least a surface of the first layer slurry after applying the first layer slurry and before applying the second layer slurry.

7. The method for manufacturing the electrode for the secondary battery according to claim 1, wherein a solid content ratio of the second layer slurry is 30% or more.

8. The method for manufacturing the electrode for the secondary battery according to claim 1, wherein a time from a completion of applying of the second layer slurry to a start of drying of the second layer slurry is 10 seconds or less in obtaining the laminated structure.

9. A method for manufacturing a secondary battery comprising:
manufacturing a positive electrode and a negative electrode by the method for manufacturing according to claim 1,
arranging the positive electrode and the negative electrode facing each other to configure a battery element, and enclosing the battery element together with an electrolyte in a casing.

10. The method for manufacturing the electrode for the secondary battery according to claim 1, wherein the viscosity of the second layer slurry is 9400 (mPa·s) or more.

* * * * *